United States Patent
Akiyama et al.

(10) Patent No.: US 12,281,889 B2
(45) Date of Patent: Apr. 22, 2025

(54) TIRE SHAPE MEASUREMENT DEVICE AND METHOD

(71) Applicant: The Yokohama Rubber Co., LTD., Kanagawa (JP)

(72) Inventors: Naoki Akiyama, Kanagawa (JP); Satoru Nishio, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 18/563,179

(22) PCT Filed: May 28, 2021

(86) PCT No.: PCT/JP2021/020473
§ 371 (c)(1),
(2) Date: Nov. 21, 2023

(87) PCT Pub. No.: WO2022/249466
PCT Pub. Date: Dec. 1, 2022

(65) Prior Publication Data
US 2024/0240936 A1    Jul. 18, 2024

(51) Int. Cl.
*G01B 11/245* (2006.01)
(52) U.S. Cl.
CPC .................. *G01B 11/245* (2013.01)
(58) Field of Classification Search
CPC .................................................. G01B 11/245
See application file for complete search history.

(56) References Cited

U.S. PATENT DOCUMENTS

| | | | | |
|---|---|---|---|---|
| 4,387,978 A * | 6/1983 | Pizzuti | ................... | G03B 17/04 396/350 |
| 4,969,350 A * | 11/1990 | Fogal, Sr. | ........... | G01M 17/027 73/146 |
| 6,539,789 B1 * | 4/2003 | Kostka | ................... | G01B 11/25 73/146 |
| 6,681,621 B1 * | 1/2004 | Kluhsman | ............... | B60C 25/16 73/146 |
| 7,935,940 B1 * | 5/2011 | Smargiassi | ........ | H01L 21/67248 250/492.1 |

(Continued)

FOREIGN PATENT DOCUMENTS

JP    04-050601 A    2/1992
JP    2007-078649 A    3/2007
(Continued)

*Primary Examiner* — Jonathan M Hansen
*Assistant Examiner* — Jarreas Underwood
(74) *Attorney, Agent, or Firm* — Thorpe North & Western

(57) ABSTRACT

Provided are a tire shape measurement device and a method. In a measurement mode in which air is injected into an inside of a tire mounted on a holding portion to inflate the tire and the tire and a non-contact sensor are relatively moved in a tire circumferential direction to detect a shape of a predetermined site of the tire over an entire circumference in the tire circumferential direction by the sensor, a detection unit of the sensor is covered with a cover portion is released. When the air is exhausted from the inside of the tire to an outside and the tire is deflated to remove the tire from the holding portion after the detection of the shape of the tire, a standby mode M1 in which the detection unit is covered with the cover portion is set.

13 Claims, 20 Drawing Sheets

(56) References Cited

U.S. PATENT DOCUMENTS

| | | | |
|---|---|---|---|
| 2002/0003965 A1* | 1/2002 | Landelle | H04N 23/663 |
| | | | 348/E17.002 |
| 2008/0218742 A1* | 9/2008 | Sakoda | G01M 17/027 |
| | | | 356/73 |
| 2011/0148764 A1* | 6/2011 | Gao | G06F 3/0317 |
| | | | 250/252.1 |
| 2014/0260583 A1* | 9/2014 | Vernyi | G01M 17/021 |
| | | | 73/146 |
| 2015/0163381 A1* | 6/2015 | Han | H04N 7/183 |
| | | | 348/144 |
| 2016/0316113 A1* | 10/2016 | Zannier | H04N 23/62 |
| 2017/0176295 A1* | 6/2017 | Fukuda | G01M 17/021 |
| 2017/0246921 A1 | 8/2017 | Hoeldrich et al. | |
| 2019/0310533 A1* | 10/2019 | Xiao | G01R 1/02 |
| 2020/0047569 A1* | 2/2020 | De Stasio | B29D 30/0633 |
| 2022/0332071 A1* | 10/2022 | Roy | B29C 64/20 |

FOREIGN PATENT DOCUMENTS

| | | |
|---|---|---|
| JP | 2008-203258 A | 9/2008 |
| JP | 2009-014613 A | 1/2009 |
| JP | 2014-240800 A | 12/2014 |
| JP | 2017-009483 A | 1/2017 |

\* cited by examiner

TIRE SHAPE MEASUREMENT DEVICE AND METHOD

TECHNICAL FIELD

The present technology relates to a tire shape measurement device and a method and particularly relates to a tire shape measurement device and a method that allow reducing maintenance work by suppressing contamination of a sensor used for shape measurement of a tire and improving measurement work efficiency.

BACKGROUND ART

At a tire production site, there is a step of confirming whether a shape of a tire is an objective reference shape. For example, when a tire after vulcanization is inspected, a tread shape is measured using a non-contact sensor, such as a laser sensor, in a state where the tire supported by a tire support portion is inflated to a specified internal pressure (see, for example, Japan Unexamined Patent Publication No. 2017-9483 A). After the measurement is completed, air inflated inside the tire is exhausted, the tire is removed from the tire support portion, and tread shapes of other tires are sequentially measured.

Various members and materials are present in a tire production site. Therefore, surrounding powder or the like may fly by an exhaust flow when the air injected into the tire is exhausted. The flied powder or the like adheres to the non-contact sensor and accumulates over time. In particular, since powder having a releasing effect, such as talc, adheres to an inner surface of a vulcanized tire, the powder is likely to adhere to and accumulate on the non-contact sensor. When measurement is performed using a non-contact sensor in a contaminated state due to adhesion and accumulation of powder or the like, the measurement accuracy is reduced. Therefore, maintenance work of cleaning the sensor to remove the powder or the like needs to be performed periodically or timely. Since the measurement cannot be performed while the maintenance work is performed, there is room for improvement to improve the measurement work efficiency.

SUMMARY

The present technology provides a tire shape measurement device and a method that allow reducing maintenance work by suppressing contamination of a sensor used for shape measurement of a tire and improving measurement work efficiency.

A tire shape measurement device of the present technology includes: a holding portion on which a tire is mounted; an air injection portion that injects air into an inside of the tire mounted on the holding portion to inflate the tire; an air exhaust portion that exhausts the air from the inside of the tire inflated to an outside to deflate the tire; a non-contact sensor that detects a shape of the tire inflated; a circumferential movement mechanism that relatively moves the tire held by the holding portion and the sensor in a tire circumferential direction; a calculation unit that receives detection data from the sensor. A cover portion that can cover a detection unit of the sensor, a switching mechanism that switches a mode between a standby mode and a measurement mode, the detection unit being in a state of being covered with the cover portion in the standby mode, and the detection unit being released from the state of being covered with the cover portion to allow the shape of the tire to be detected by the sensor in the measurement mode, and a control unit that controls the switching mechanism are provided. The standby mode is set when the tire is deflated.

A tire shape measurement method of the present technology includes: injecting air into an inside of a tire mounted on a holding portion to inflate the tire; detecting a shape of a predetermined site of the tire over an entire circumference in a tire circumferential direction by a non-contact sensor while relatively moving the tire inflated and the sensor in the tire circumferential direction; and exhausting the air from the inside of the tire in the inflated state to an outside after the step of detecting to remove the tire deflated from the holding portion. A cover portion that can cover a detection unit of the sensor is provided. A standby mode and a measurement mode are made switchable by using a switching mechanism. The detection unit is in a state of being covered with the cover portion in the standby mode. The detection unit is released from the state of being covered with the cover portion to allow the shape of the tire to be detected by the sensor in the measurement mode. The standby mode is set when the tire is deflated.

According to the present technology, the standby mode is set when the inflated tire held by the holding portion is deflated. Therefore, even when powder or the like present around the tire is flied by an exhaust flow of the air exhausted from the inside to the outside of the deflated tire, the detection unit of the sensor is covered with the cover portion. Therefore, adhesion and accumulation of the flied powder or the like on the detection unit to be contaminated is suppressed. This eliminates the need for frequently performing maintenance work that cleans the detection unit to ensure measurement accuracy by the sensor. In association with this, the maintenance work can be reduced and the period during which the shape of the tire cannot be measured is reduced, which is advantageous for improvement in measurement work efficiency.

DETAILED DESCRIPTION

Figure 1:
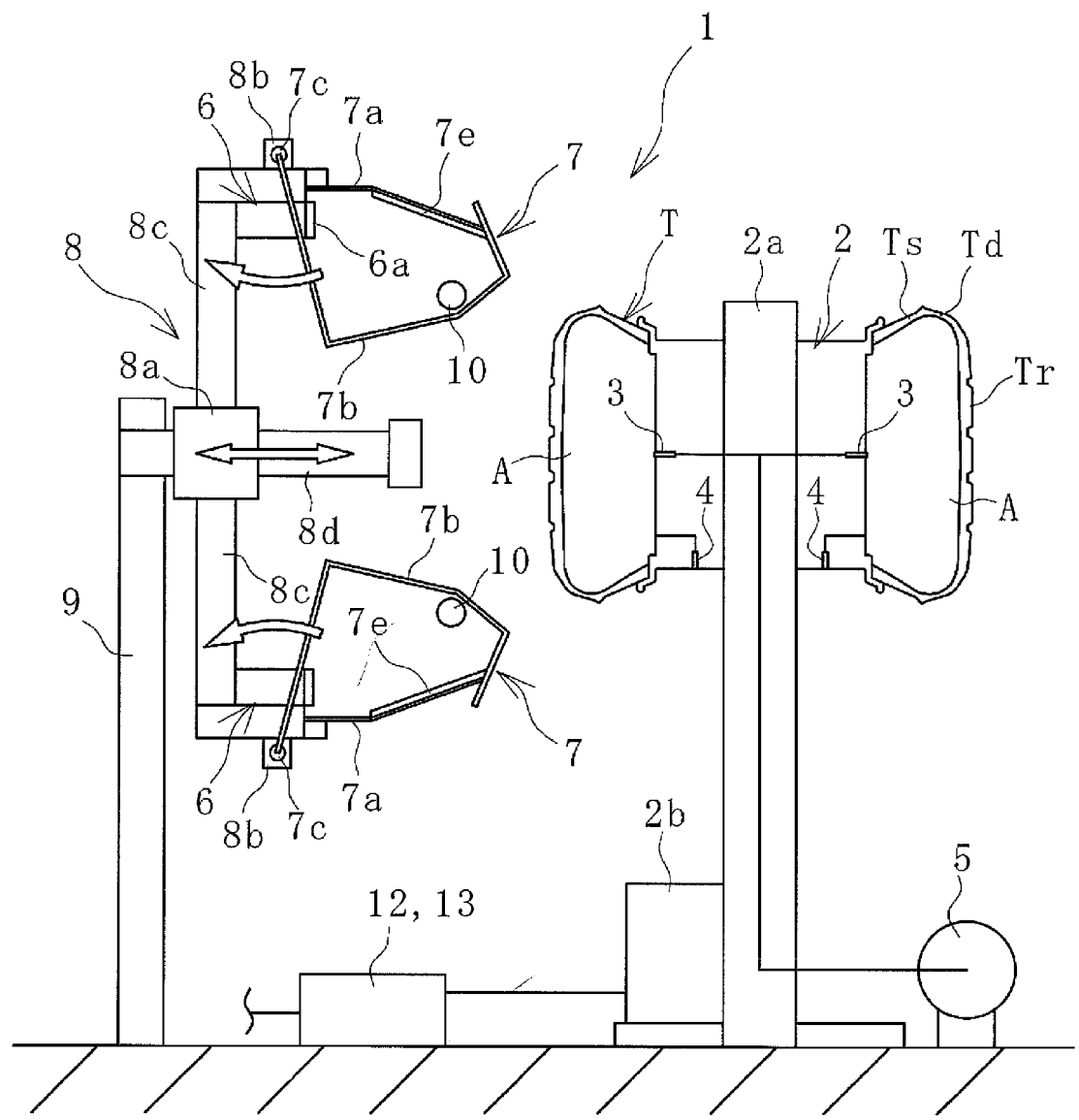
FIG. 1 is an explanatory diagram illustrating an example of a tire shape measurement device in a longitudinal cross-sectional view.

Hereinafter, a tire shape measurement device and a method of the present technology will be described based on embodiments illustrated in the drawings.

Figure 2:
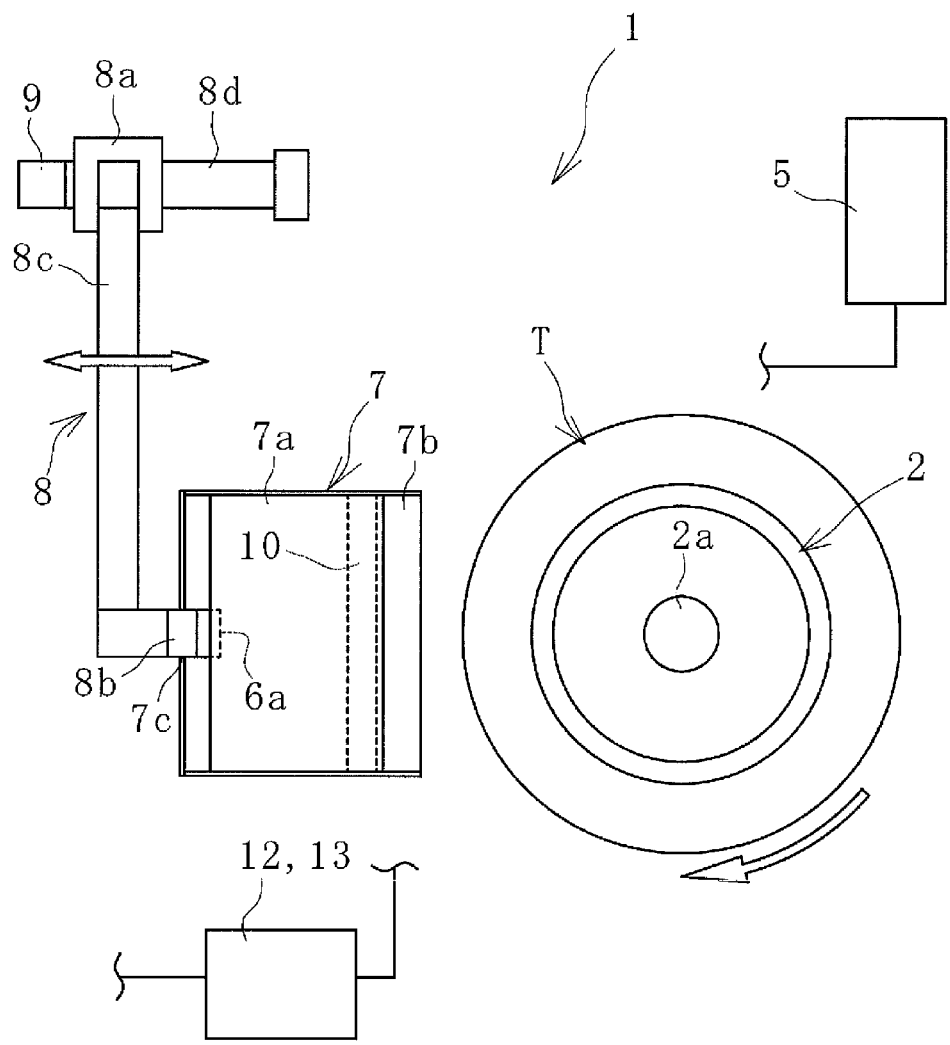
FIG. 2 is an explanatory diagram illustrating an example of the shape measurement device of FIG. 1 in a plan view.

The embodiments of a tire shape measurement device 1 of the present technology illustrated in FIGS. 1 and 2 as an example measure a shape of a vulcanized pneumatic tire T. The type or size of the tire T is not particularly limited. A portion whose shape is measured by the shape measurement device 1 can be arbitrarily set, and at least one of a tread portion Tr, a shoulder portion Td, and a side portion Ts is selected. The surface shape is measured by the shape measurement device 1 over the entire circumference in the tire circumferential direction of one portion or two portions selected from these portions or the three portions. The shape measurement device 1 of this embodiment measures the surface shape of the shoulder portion Td.

The shape measurement device 1 includes a holding portion 2 on which the tire T is mounted, an air injection portion 3 for injecting air A into the inside of the tire T, an air exhaust portion 4 for exhausting the air A from the inside of the tire T to the outside, a non-contact sensor 6, a rotation shaft 2a and a drive motor 2b serving as circumferential movement mechanisms for relatively moving the tire T held by the holding portion 2 and the sensor 6 in the tire circumferential direction, a calculation unit 12 that receives detection data from the sensor 6, a cover portion 7 that can cover a detection unit 6a of the sensor 6, a switching mechanism 8, and a control unit 13 that controls the switching mechanism 8. In this embodiment, the shape measurement device 1 further includes an inspection member 10. The inspection member 10 may be optionally provided.

The holding portion 2 holds the tire T by mounting the tire T in a deflated state and then inflating the tire T such that compression bonding is strongly performed on a bead portion. The holding portion 2 only needs to hold the inflated tire T and has a configuration similar to a tire rim (wheel).

The holding portion 2 is detachably attached to the rotation shaft 2a extending vertically. The rotation shaft 2a is disposed at the central portion of the holding portion 2 in a plan view. The rotation shaft 2a is rotated about its axial center by a drive source, such as the drive motor 2b. The holding portion 2 rotates around the rotation shaft 2a, which is rotationally driven by the drive motor 2b. In this embodiment, the tire T and the sensor 6 relatively move in the tire circumferential direction by the tire T rotating around the rotation shaft 2a in a state where the sensor 6 is fixed at a predetermined position. Therefore, the rotation shaft 2a and the drive motor 2b function as the circumferential movement mechanisms. Note that the tire T held by the holding portion 2 is fixed without being rotated, and a circumferential movement mechanism that moves the sensor 6 in the tire circumferential direction with respect to the tire T can be employed. The rotation shaft 2a can have a configuration of being extended horizontally.

An air injection path extends inside the holding portion 2 and the rotation shaft 2a, one end of the air injection path is connected to the air injection portion 3, and the other end is connected to an air compressor 5. The air injection portion 3 is installed to be exposed on the outer circumferential surface of the cylindrical holding portion 2. The air A supplied from the air compressor 5 is sent to the air injection portion 3. The air injection portion 3 injects the air A into the inside of the tire T mounted on the holding portion 2 to inflate the tire T to a specified internal pressure. The specified internal pressure is set for each of the specifications of the tire T, for example, and is about from 200 kPa to 450 kPa in a tire for a passenger vehicle and about from 450 kPa to 600 kPa in a tire for a truck or a bus.

An air exhaust path extends inside the holding portion 2, one end of the air exhaust path is connected to the air exhaust portion 4, and the other end is open to the outer circumferential surface of the holding portion 2. In this embodiment, the air exhaust portion 4 is installed to be exposed on the lower surface of the holding portion 2, but can be installed on the upper surface of the holding portion 2 or the rotation shaft 2a. An open/close valve is provided in the air exhaust portion 4, and when the air exhaust portion 4 is opened, the inside and the outside of the tire T held by the holding portion 2 communicate with one another, and the air A therein is exhausted to the atmosphere. Therefore, the air exhaust portion 4 can deflate the tire T by exhausting the air A inside the inflated tire T to the outside. When the air exhaust portion 4 is closed, the air A inside the tire T held by the holding portion 2 is held inside as it is.

The sensor 6 detects a surface shape of a measurement site (the shoulder portion Td in this embodiment) of the tire T held in the inflated state by the holding portion 2. The known laser sensor can be used as the sensor 6. A measurement range of a measurement site is irradiated with detection light L (laser light L) output from the detection unit 6a of the sensor 6, and the detection light L reflected by the measurement range is input to the detection unit 6a. Based on the time until the detection light L output from the detection unit 6a is input to the detection unit 6a, a distance from the detection unit 6a to the surface of the measurement range is grasped, and as a result, the surface shape of the measurement site is grasped.

In this embodiment, while the two sensors 6 are provided so as to be vertically separated from one another, the number of sensors 6 may be one or three or more, and the appropriate number of the sensors 6 can be provided based on the area of the measurement site or the like. The sensor 6 is fixed to an arm 8c. The control unit 13 controls not only the switching mechanism 8, which will be described below, but also the movements of the drive motor 2b (rotation shaft 2a) and the air compressor 5 and the opening and closing operations of the air exhaust portion 4.

The cover portion 7 can be switched between a mode (standby mode M1) in which the inside of the cover portion 7 is blocked from the outside and a mode (measurement mode M2) in which the blocked state is released. In the standby mode M1, the cover portion 7 covers the detection unit 6a to prevent adhesion and accumulation of powder P or the like to the detection unit 6a. The cover portion 7 need not completely prevent the adhesion and accumulation of the powder P or the like to the detection unit 6a, but has a specification that can reduce the amount of adhesion and accumulation of the powder P by 50% or more, and more preferably 80% or more, compared with the case where the cover portion 7 is not provided. Therefore, the cover portion 7 that further airtightly covers the detection unit 6a is advantageous in reducing the amount of adhesion and accumulation of the powder P. Note that the configuration is not limited to this embodiment in which only the detection unit 6a can be covered by the cover portion 7, and a configuration in which the entire sensor 6 can be covered with the cover portion 7 may be employed.

In this embodiment, since the dedicated cover portion 7 is disposed for the detection unit 6a of each of the sensors 6, the two cover portions 7 are provided. Since the respective cover portions 7 have basically the same structure, only one of them will be described.

The cover portion 7 is attached to the leading edge portion of the arm 8c and includes a fixed cover 7a and a movable cover 7b. The fixed cover 7a is fixed to the leading edge portion of the arm 8c and protrudes forward (toward the holding portion 2). The movable cover 7b is pivotably attached to a support shaft 7c fixed to the leading edge portion of the arm 8c.

When the movable cover 7b pivots about the support shaft 7c so as to approach the fixed cover 7a, a closed space is formed by the fixed cover 7a and the movable cover 7b (the mode enters the standby mode M1). The closed space formed by the fixed cover 7a and the movable cover 7b opens and becomes an open space (the mode transitions to the measurement mode M2) when the movable cover 7b pivots so as to be away from the fixed cover 7a.

A mirror 7e is attached to the inside of the fixed cover 7a. The mirror 7e can optionally be provided. Inside the movable cover 7b, a rod-shaped inspection member 10 extends so as to cross the movable cover 7b.

The detection light L output from the detection unit 6a is reflected by the mirror 7e and the measurement site is irradiated with the detection light L, and the detection light L reflected by the measurement site is reflected by the mirror 7e and is input to the detection unit 6a. When the mirror 7e is not provided, the measurement site is directly irradiated with the detection light L output from the detection unit 6a, and the detection light L reflected by the measurement site is directly input to the detection unit 6a.

The switching mechanism 8 switches the mode between the standby mode M1 and the measurement mode M2. The measurement mode M2 is a stage in which the shape of the tire T inflated and held by the holding portion 2 is measured by the sensor 6 (a stage in which measurement is performed). The standby mode M1 is a stage before and after the transition to the measurement mode M2. Therefore, the steps of transition from the standby mode M1 to the measurement mode M2 and transition from the measurement mode M2 to the standby mode M1 are repeatedly performed.

In this embodiment, the switching mechanism 8 includes an approach/separation drive portion 8a for moving the arm 8c so as to approach and separate from the tire T (holding portion 2) and a pivot drive unit 8b for pivoting the movable cover 7b about the support shaft 7c. The arm 8c is fixed to the approach/separation drive portion 8a. The approach/separation drive portion 8a moves along a guide rail 8d extending horizontally toward the rotation shaft 2a. The guide rail 8d is fixed to a support post 9 erected on a ground. For example, a servo motor is used as the approach/separation drive portion 8a, and the approach/separation drive portion 8a can be moved to an arbitrary position along the guide rail 8d. A fluid cylinder or the like can be used as the approach/separation drive portion 8a. The arm 8c, the cover portion 7, and the sensor 6 also move along the guide rail 8d together with the approach/separation drive portion 8a. Therefore, the sensor 6 moves to approach and separate from the tire T.

As the pivot drive unit 8b, for example, a servo motor is used, and the pivot drive unit 8b allows the movable cover 7b to pivot and move around the support shaft 7c at an arbitrary angle. Since the inspection member 10 is fixed to the movable cover 7b, the inspection member 10 pivotally moves together with the movable cover 7b. In this embodiment, a notch is formed in the movable cover 7b so as not to interfere with the sensor 6 or the arm 8c when the movable cover 7b pivots. The notch of the movable cover 7b is preferably as small as possible, and the movable cover 7b can be without a notch.

The inspection member 10 has a preset shape and is disposed at a predetermined position separated from the detection unit 6a. The inspection member 10 is used in an inspection step of determining whether the sensor 6 is abnormal. The inspection member 10 can have any desired shape and be disposed as desired.

The shape of the inspection member 10 and the arrangement (the separation distance and the separation direction) of the inspection member 10 with respect to the detection unit 6a are stored in the calculation unit 12. The inspection member 10 is irradiated with the detection light L output from the detection unit 6a, and the detection light L reflected by the inspection member 10 is input to the detection unit 6a. In addition, relative movement data between the tire T and the sensor 6 in the tire circumferential direction by the circumferential movement mechanisms 2a and 2b, movement data of the approach/separation drive portion 8a, and pivot movement data of the movable cover 7b are also input to the calculation unit 12.

The calculation unit 12 calculates the shape of the measurement site of the tire T irradiated with the detection light L based on the detection data of the tire T by the sensor 6, the relative movement data by the circumferential movement mechanisms, and the movement data of the approach/separation drive portion 8a. Further, the calculation unit 12 calculates the shape of the inspection member 10 based on the detection data of the inspection member 10 by the sensor 6.

As the calculation unit 12 and the control unit 13, a computer can be used. Although a computer that functions as the calculation unit 12 and a computer that functions as the control unit 13 may be provided separately, one computer can be used as the calculation unit 12 and the control unit 13.

Next, an example of a procedure of performing a tire shape measurement method according to an embodiment of the present technology will be explained using the shape measurement device 1.

Figure 3:
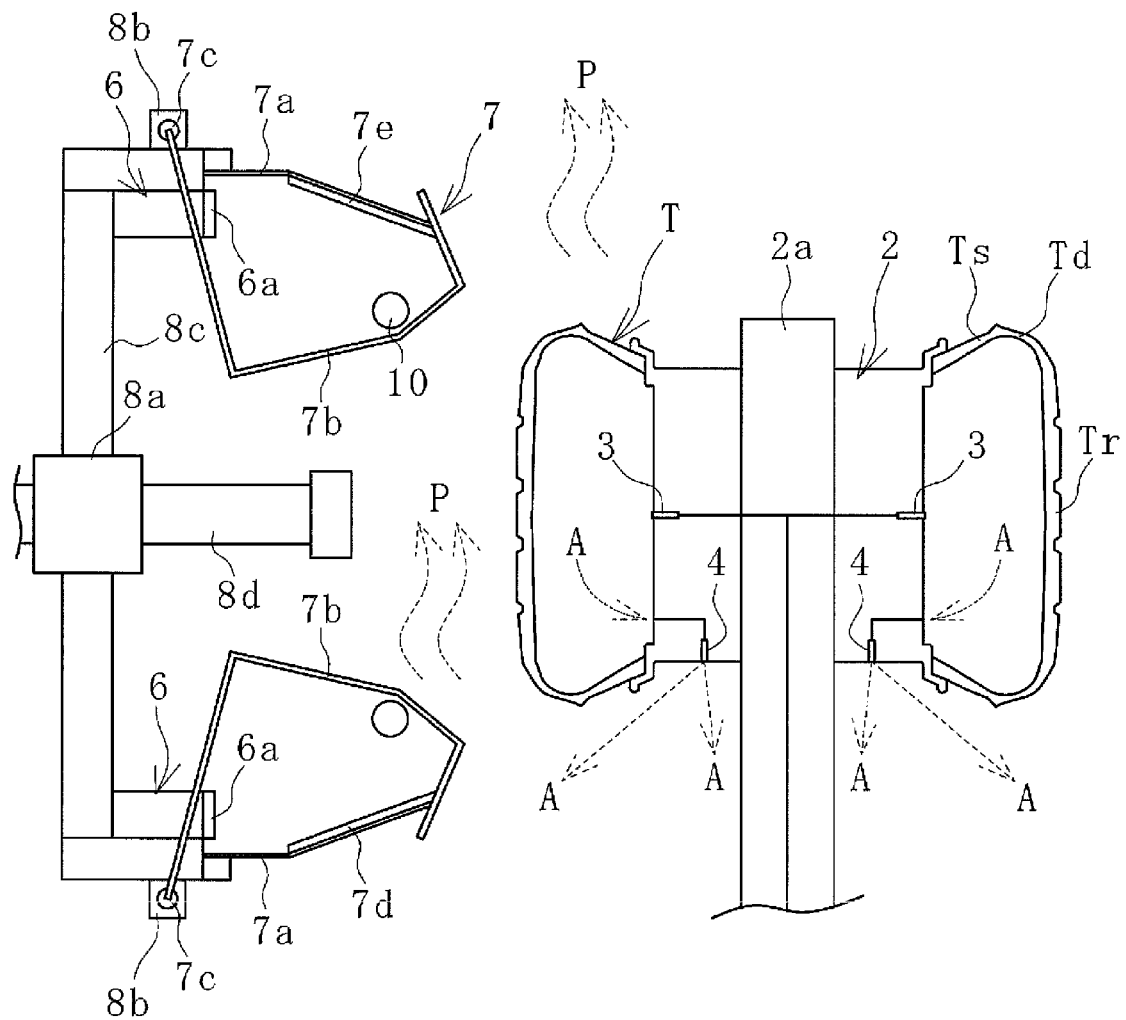
FIG. 3 is an explanatory diagram illustrating an example of a state in which a tire of FIG. 1 is deflated.
Figure 4:
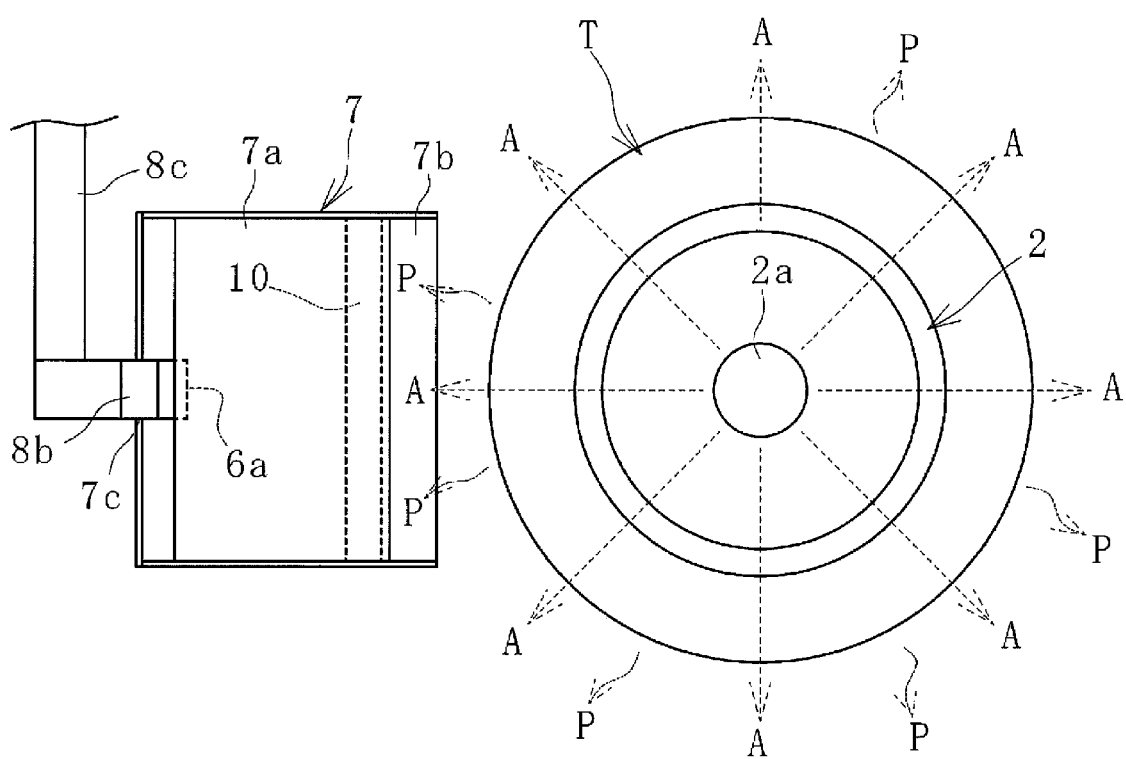
FIG. 4 is an explanatory diagram illustrating an example of the shape measurement device of FIG. 3 in a plan view.

In FIGS. 3 and 4, the air A of the tire T whose shape has been measured is exhausted from the inside to the outside to deflate the tire T. At this time, the shape measurement device 1 is in the standby mode M1. The control unit 13 causes the air A of the tire T in the inflated state to be exhausted from the air exhaust portion 4 to the outside by bringing the air exhaust portion 4 into the open valve state. The deflated tire T is removed from the holding portion 2. The exhaust flow of the air A exhausted from the air exhaust portion 4 while the tire T is deflated flies the powder P or the like present in the vicinity of the shape measurement device 1. For example, the powder P, such as talc or dust, flies to the peripheral region of the tire T.

The approach/separation drive portion 8a is at a retreated position further separated from the tire T. Therefore, the sensor 6 and the cover portion 7 are also at positions retracted from the tire T. The cover portion 7 moves to a position where the movable cover 7b pivots so as to approach the fixed cover 7a, and the closed space is formed by the fixed cover 7a and the movable cover 7b. The detection unit 6a is disposed in the formed closed space. The inspection member 10 is also disposed in this closed space.

In the standby mode M1 illustrated in FIGS. 3 and 4 as an example, the detection unit 6a is covered with the cover portion 7. Therefore, even when the powder P or the like flies outside the cover portion 7, the cover portion 7 is interposed between the powder P or the like and the detection unit 6a, and therefore the cover portion 7 blocks the flied powder P or the like and adhesion and accumulation on the detection unit 6a is suppressed. Similarly, adhesion and accumulation of the powder P or the like on the inspection member 10 are also suppressed.

Figure 5:
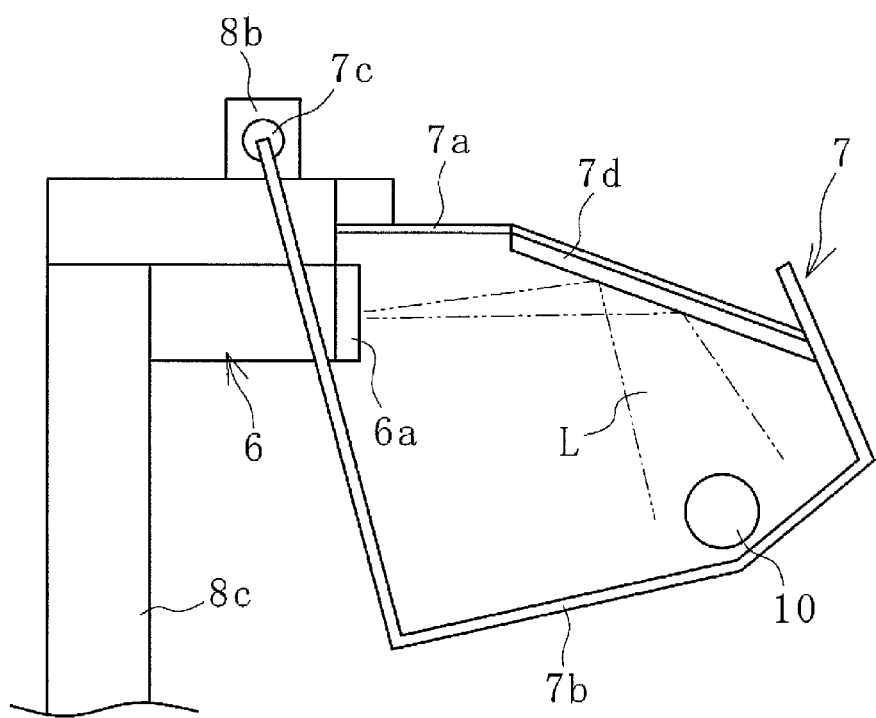
FIG. 5 is an explanatory diagram illustrating an example of an inspection step performed in a cover portion of FIG. 3.

As illustrated in FIG. 5 as an example, in this embodiment, the inspection step of the sensor 6 is performed in the standby mode M1. In the closed space formed by the cover portion 7, the detection light L output from the detection unit 6a is reflected by the mirror 7e and the inspection member 10 is irradiated with the detection light L, and the detection light L reflected by the inspection member 10 is reflected by the mirror 7e and is input to the detection unit 6a. The calculation unit 12 calculates the shape of the inspection member 10 based on the detection data from the sensor 6 (detection unit 6a).

Next, the calculation unit 12 compares the calculated shape of the inspection member 10 with the shape of the inspection member 10 stored in advance, thereby determining whether the sensor 6 is abnormal. When a difference between the shapes of both is larger than a preset allowable range, the sensor 6 is determined to be abnormal, and when the difference is equal to or less than the allowable range, the sensor 6 is determined to function normally.

When the detection by the sensor 6 is determined to be abnormal, the calculation unit 12 calibrates the sensor 6 such that the detection data from the sensor 6 that has detected the inspection member 10 falls within a preset normal range. When the sensor 6 is determined to be abnormal, a configuration in which a warning for notifying the abnormality is issued (generation of a warning, lighting of a warning lamp, or the like) or a configuration in which transition to the measurement mode M2 is disabled can be employed.

Figure 6:
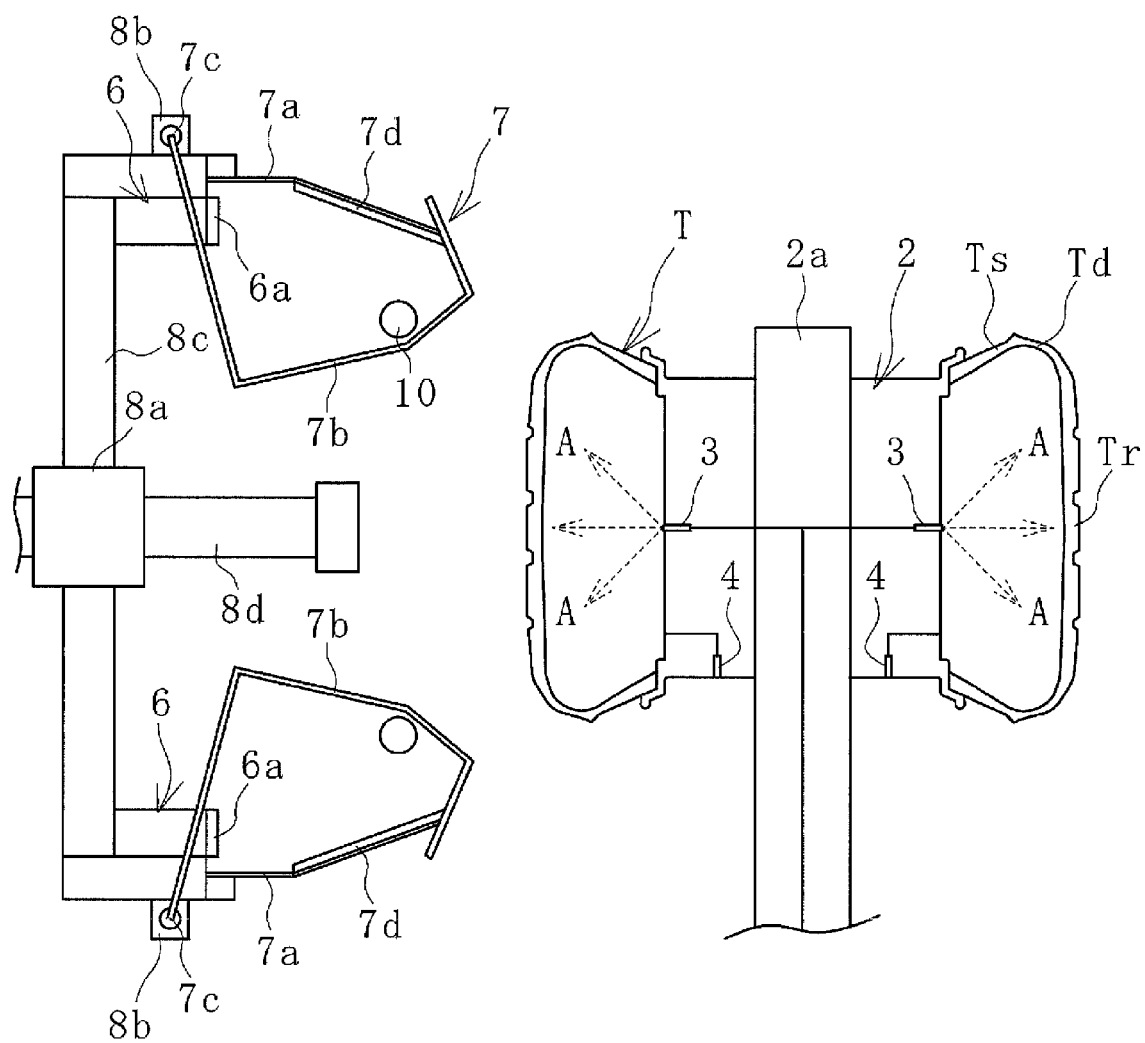
FIG. 6 is an explanatory diagram illustrating an example of a state in which a new tire mounted on a holding portion of FIG. 3 is inflated.

As illustrated in FIG. 6 as an example, another tire T to be measured next is mounted on the holding portion 2 from which the deflated tire T has been removed. The air A sent from the air compressor 5 is injected into the inside of the mounted tire T from the air injection portion 3. As a result, the tire T is inflated to a specified internal pressure and firmly held by the holding portion 2. Thus, setting of the other tire T is completed.

The standby mode M1 is continued until the state in which the powder P or the like flies outside the cover portion 7 is settled. For example, the standby mode M1 is maintained until the other tire T is set to the holding portion 2. Since the inspection step is completed in about several seconds, the inspection step can be completed during the standby mode M1.

Figure 7:
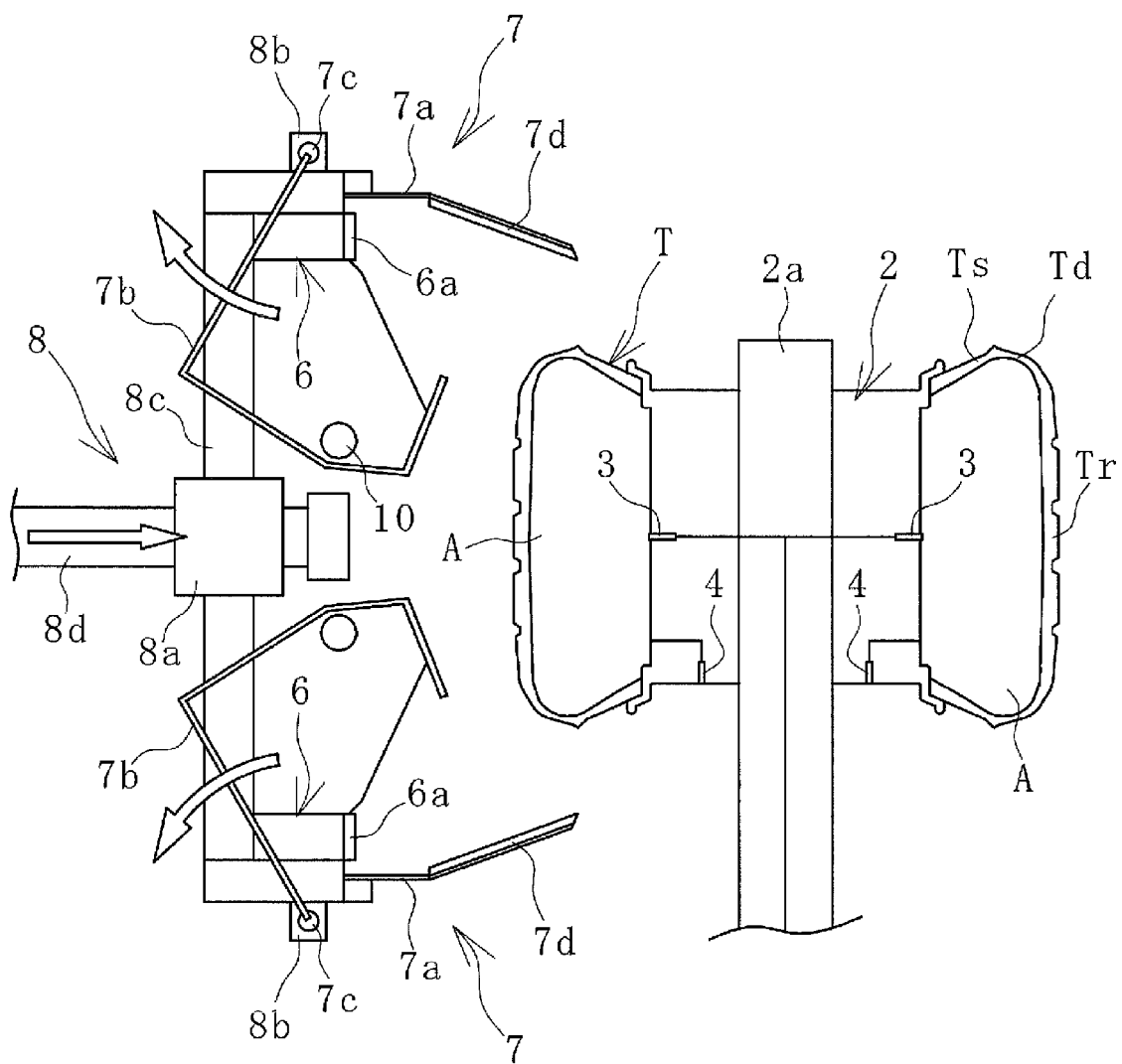
FIG. 7 is an explanatory diagram illustrating an example of a state in which the cover portion of FIG. 6 is in an open state and a sensor is moved to a measurement position.

Next, as illustrated in FIG. 7 as an example, the mode transitions from the standby mode M1 to the measurement mode M2. The pivot drive unit 8b pivots the movable cover 7b fixed cover 7a around the support shaft 7c in a direction away from the fixed cover 7a. In association with this, the cover portion 7 forming the closed space is opened to form the open space, and the state in which the detection unit 6a is covered with the cover portion 7 is released.

In addition, the approach/separation drive portion 8a moves along the guide rail 8d and is disposed at a position close to the tire T. Accordingly, the sensor 6 also moves to approach the tire T and is positioned at a predetermined measurement position. The transition from the standby mode M1 to the measurement mode M2 is completed by the above-described operations of the approach/separation drive portion 8a and the pivot drive unit 8b. At this time, the mirror 7e installed on the inside of the fixed cover 7a is in a state of being disposed at a predetermined position separated in the width direction of the tire T. The arrangement of the mirror 7e is set in advance such that a desired site of the tire T is irradiated with the detection light L.

Figure 8:
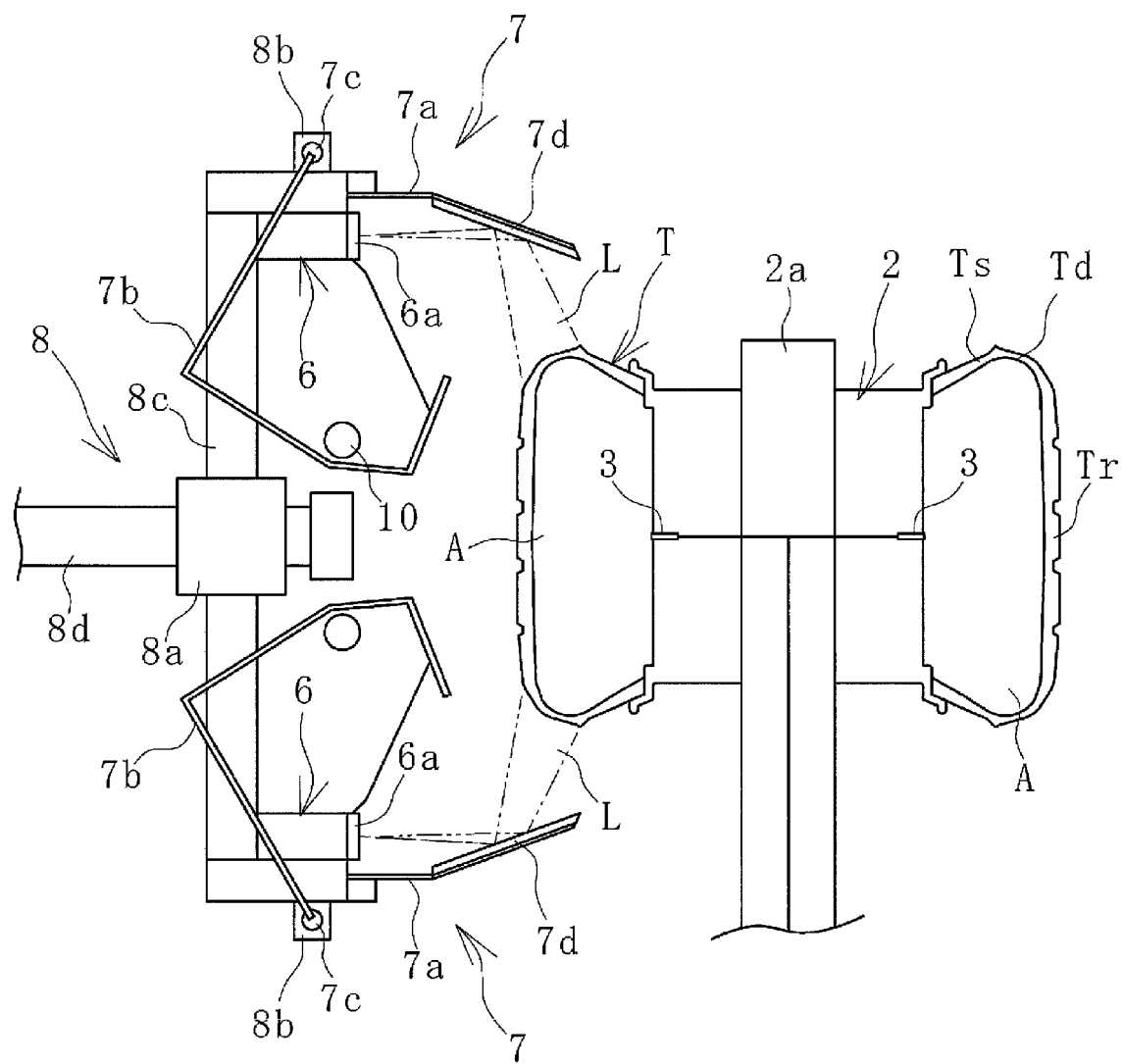
FIG. 8 is an explanatory diagram illustrating an example of a state in which a shape of a shoulder portion of the tire of FIG. 7 is measured.
Figure 9:
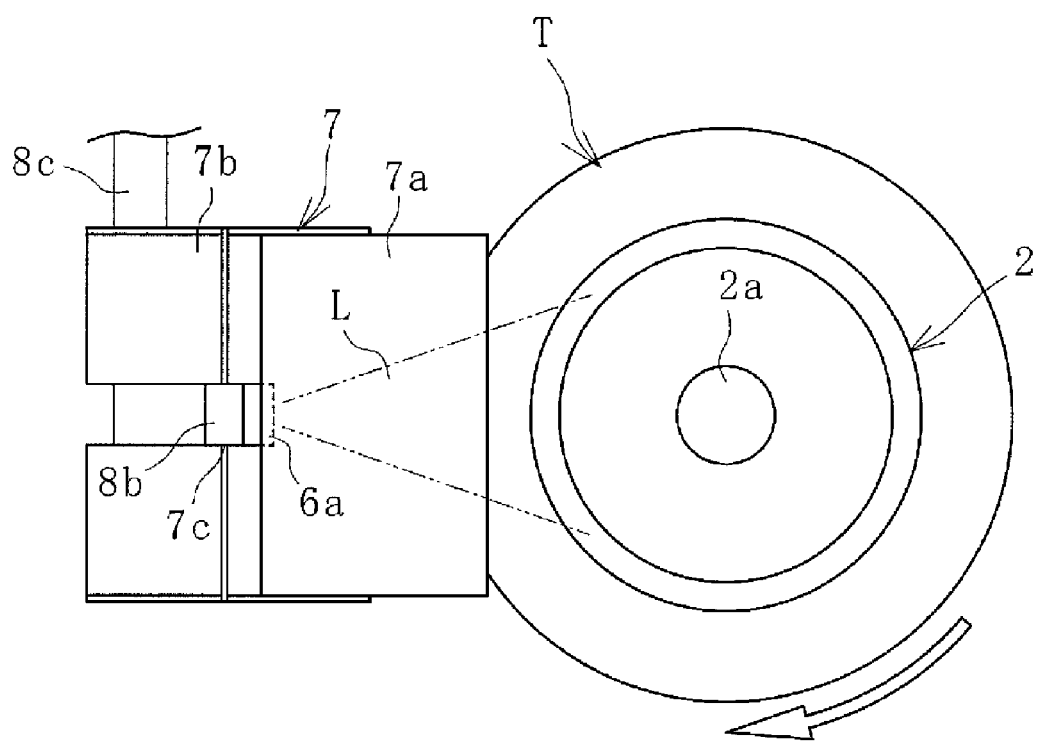
FIG. 9 is an explanatory diagram illustrating an example of the shape measurement device of FIG. 8 in a plan view.

Next, in the measurement mode M2 illustrated in FIGS. 8 and 9 as an example, the detection light L output from the detection unit 6a is reflected by the mirror 7e and the measurement site (shoulder portion Td) of the tire T is irradiated with the detection light L, and the detection light L reflected by the measurement site is reflected by the mirror 7e and is input to the detection unit 6a. At this time, the tire T is rotated around the rotation shaft 2a. The calculation unit 12 calculates the surface shape of the shoulder portion Td over the entire circumference in the circumferential direction based on the detection data from the sensor 6 (detection unit 6a). In this way, the surface shape of the entire circumference of the shoulder portion Td is detected, and data of the calculated surface shape is stored in the calculation unit 12.

In an embodiment of the present technology, as described above, in the standby mode M1, the detection unit 6a is covered with the cover portion 7. In the measurement mode M2, the state in which the detection unit 6a is covered with the cover portion 7 is released, and the sensor 6 detects the shape of the predetermined site of the tire T. When the tire T is deflated, the standby mode M1 is always set. Therefore, even when the powder P or the like flies by the exhaust flow of the air A exhausted from the deflated tire T to the outside, it is advantageous in suppressing adhesion or accumulation of the powder P or the like to contaminate the detection unit 6a. Therefore, a frequency of maintenance work that cleans the contamination of the detection unit 6a to ensure maintenance work by the sensor 6 can be reduced, and in association with this, the maintenance work can be reduced.

Although the shape measurement device 1 cannot be used during the maintenance work, since the frequency of the maintenance work is reduced, the period during which the shape of the tire T cannot be measured is reduced. Therefore, application of the present technology is advantageous in improvement in the working efficiency of the shape measurement of the tire T. Since the shape measurement of the tire T is often performed as a series of steps when the tire T is manufactured, an embodiment of the present technology greatly contributes to improvement in the productivity of the tire T.

In this embodiment, when the shapes of a plurality of the tires T are continuously and sequentially measured, the inspection step is performed within the time of the standby mode T1. That is, since a special time for the inspection step is not required, the working efficiency of the shape measurement of the tire T is not lowered. That is, the shape of the tire T can be measured without reducing the productivity of the tire T.

The inspection step can be performed every time the shapes of the predetermined number of (for example, two to five) the tires T are measured. Alternatively, the inspection step can be performed every time the shape of one tire T is measured, that is, in each of the standby modes M1 immediately before each of the measurement modes M2. For the tire T having a special specification in which the surface shape needs to be grasped more accurately, the inspection step is preferably performed every time the shape of one tire T is measured.

By changing the arrangement of the mirror 7e, the detection light L output from the detection unit 6a can be set in a desired direction regardless of the direction of the detection unit 6a. Therefore, the mirror 7e may be used when the sensor 6 cannot be disposed in the desired direction due to the limitation of the installation space or the like. In addition, installation of the mirror 7e at the inside of the cover portion 7 as in this embodiment eliminates the need for preparing a special space for the mirror 7e. This is also advantageous in suppressing adhesion and accumulation of the powder P or the like on the mirror 7e.

The embodiment of the shape measurement device 1 illustrated in FIGS. 10 to 14 as an example differs from the above-described embodiment mainly in the cover portion 7 and the switching mechanism 8. Other components (members), such as the holding portion 2, are similar to those of the embodiment described above. In this embodiment, the shape measurement device 1 detects the surface shapes of the side portion Ts and the shoulder portion Td of the tire T.

The cover portion 7 includes the fixed cover 7a fixed to the support post 9 and the movable cover 7b moving horizontally to approach and separate from the fixed cover 7a. The fixed cover 7a is a box-shaped body having an open leading edge side (the right side in FIG. 10), and the movable cover 7b has a lid-shaped body that opens and closes the opening of the fixed cover 7a. The sensor 6 fixed to the leading edge portion of the arm 8c is fixed to the inside of the movable cover 7b. The rod-shaped inspection member 10 is fixed to the inside of the fixed cover 7a so as to cross the fixed cover 7a. The arm 8c horizontally moves by the approach/separation drive portion 8a, and in association with this, the sensor 6 and the movable cover 7b also horizontally move.

Figure 10:
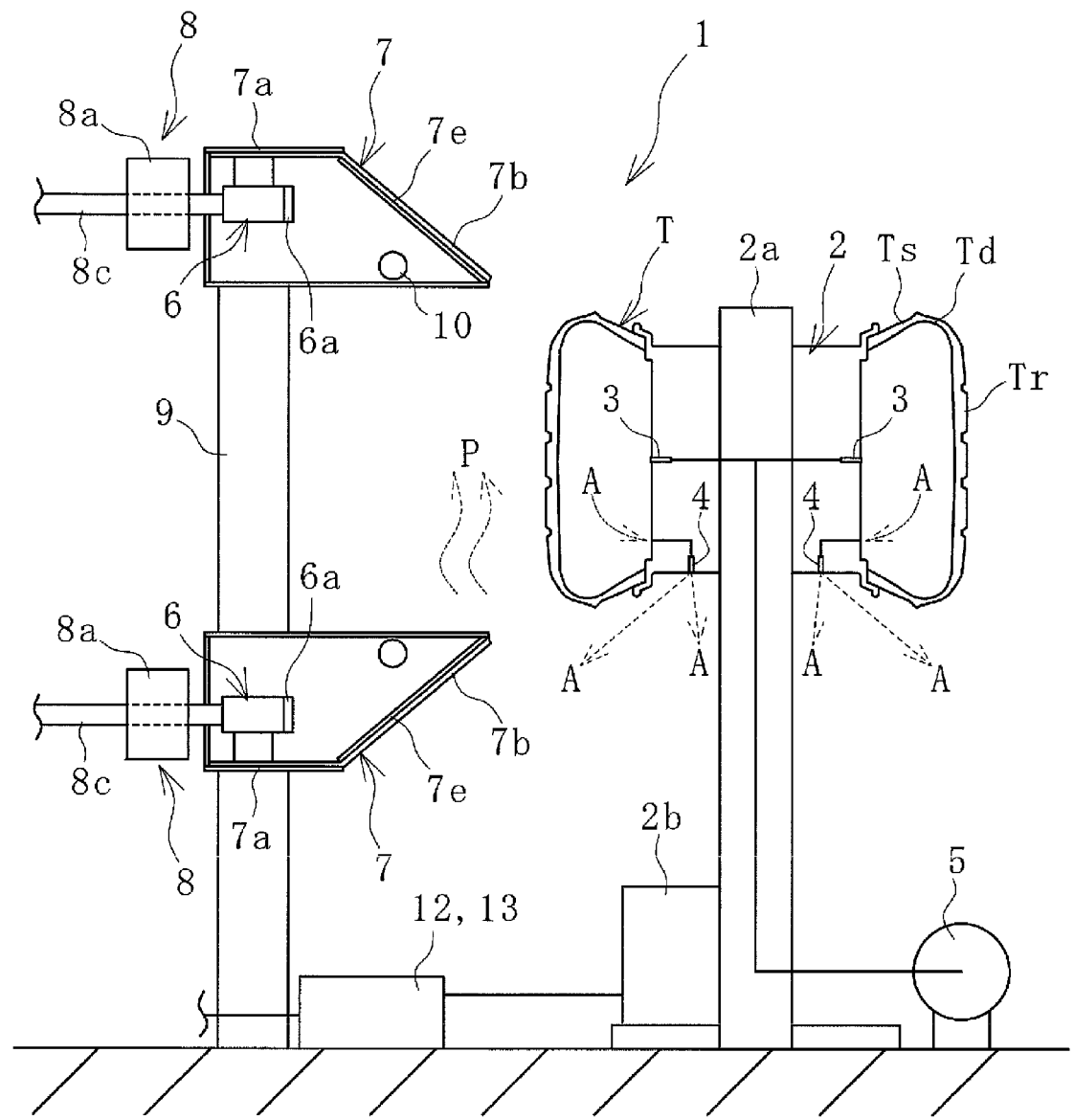
FIG. 10 is an explanatory diagram illustrating an example of a shape measurement device of another embodiment in a longitudinal cross-sectional view.
Figure 11:
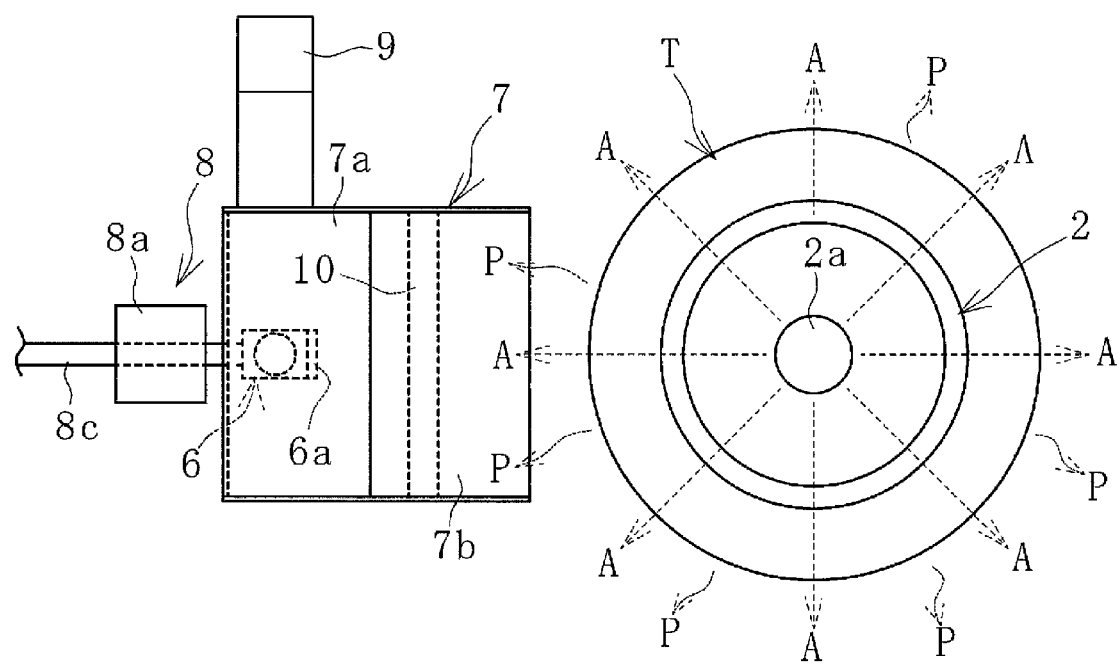
FIG. 11 is an explanatory diagram illustrating an example of the partially omitted shape measurement device of FIG. 10 in a plan view.

In the standby mode M1 illustrated in FIGS. 10 and 11 as an example, the arm 8c is at a retreated position further separated from the tire T. Therefore, the sensor 6 and the movable cover 7b are also at positions retracted from the tire T. The movable cover 7b is at a position close to the fixed cover 7a, and a closed space is formed by the fixed cover 7a and the movable cover 7b. The detection unit 6a (sensor 6) is disposed in the formed closed space. The inspection member 10 is also disposed in this closed space.

Figure 13:
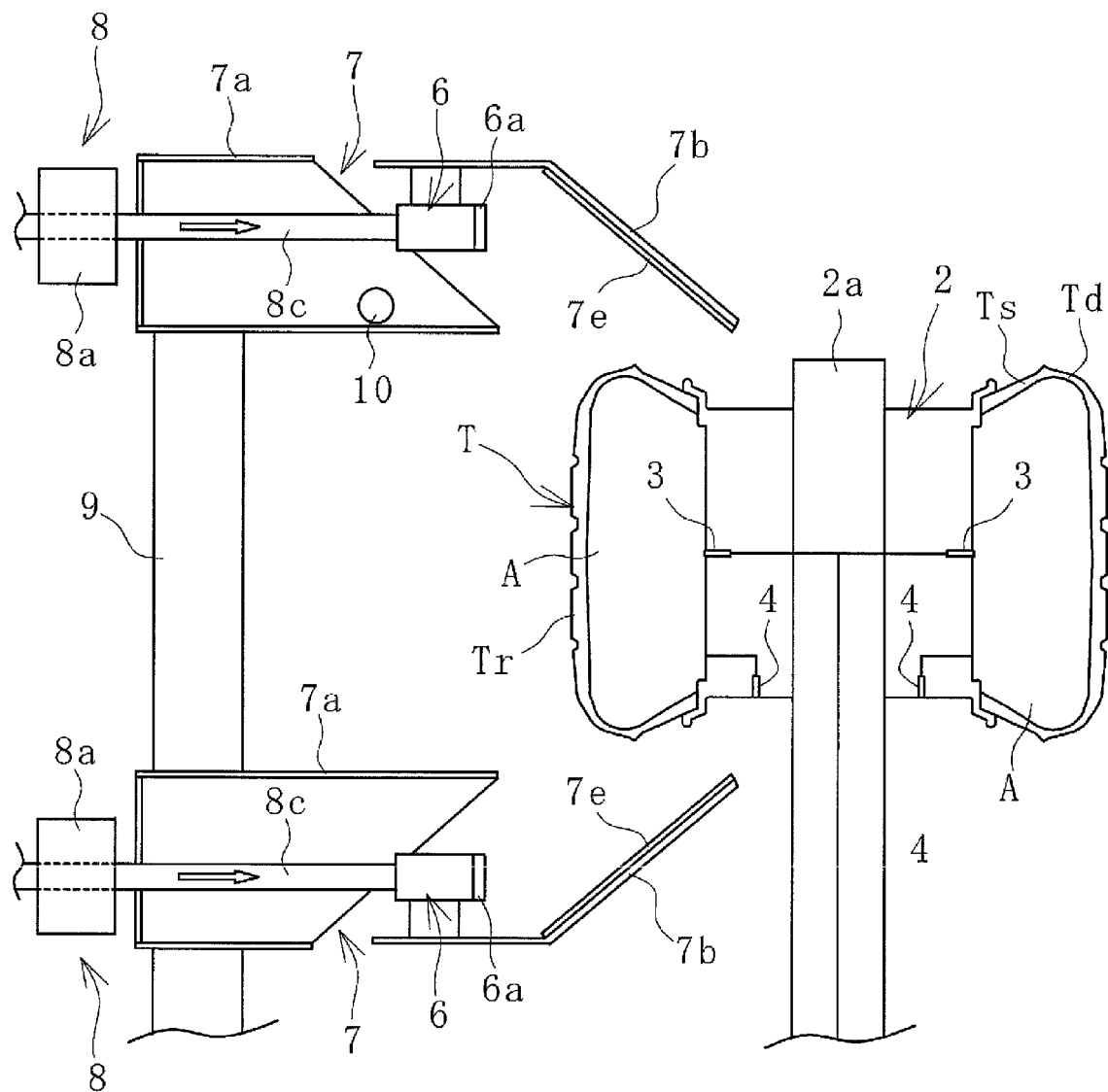
FIG. 13 is an explanatory diagram illustrating an example of a state in which the cover portion of FIG. 10 is in an open state and a sensor is moved to a measurement position.

As illustrated in FIG. 13 as an example, when the arm 8c moves to approach the tire T, the sensor 6 and the movable cover 7b also move to approach the tire T. In association with this, the cover portion 7 forming the closed space is opened to form the open space, the state in which the detection unit 6a is covered with the cover portion 7 is released to transition from the standby mode M1 to the measurement mode M2. Therefore, the approach/separation drive portion 8a functions as the switching mechanism 8.

In the standby mode M1 illustrated in FIGS. 10 and 11 as an example, similar to the above-described embodiment, since the detection unit 6a and the inspection member 10 are covered with the cover portion 7, even when the powder P or the like flies outside the cover portion 7, the cover portion 7 blocks the powder P or the like and adhesion and accumulation on the detection unit 6a is suppressed. Similarly, adhesion and accumulation of the powder P or the like on the inspection member 10 are also suppressed.

Figure 12:
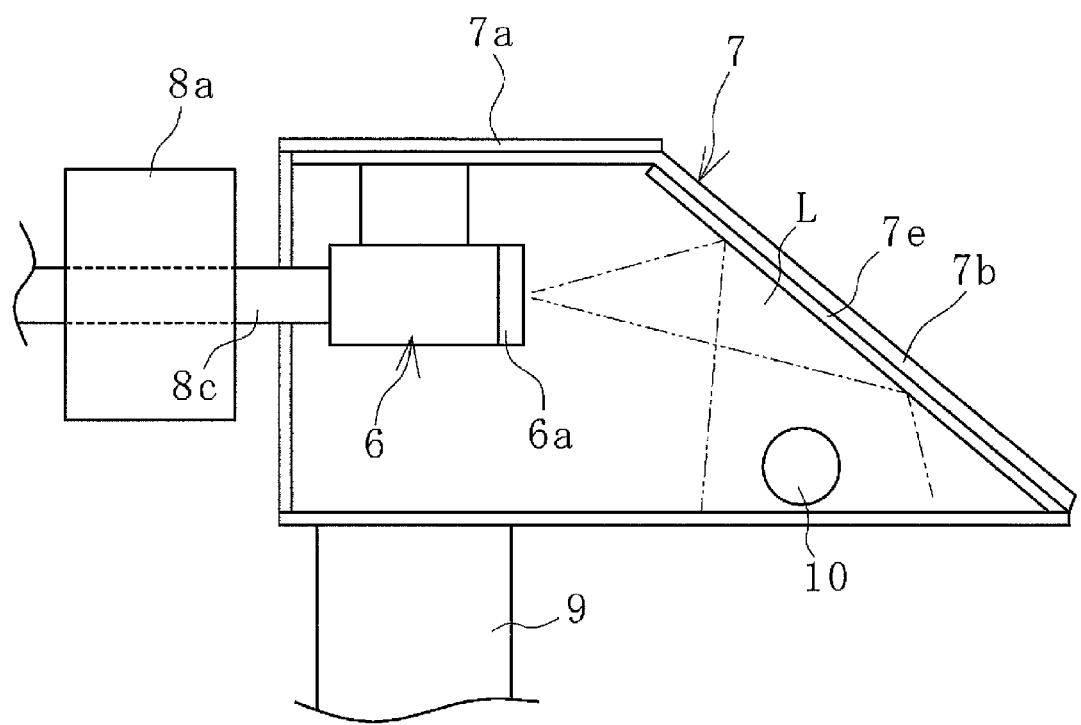
FIG. 12 is an explanatory diagram illustrating an example of the inspection step performed in a cover portion of FIG. 10.

As illustrated in FIG. 12 as an example, in the standby mode M1, the inspection step of the sensor 6 is performed similar to the above-described embodiment. The calculation unit 12 calculates the shape of the inspection member 10 based on the detection data from the sensor 6 (detection unit 6a). The calculation unit 12 compares the calculated shape of the inspection member 10 with the shape of the inspection member 10 stored in advance, thereby determining whether the sensor 6 is abnormal.

As illustrated in FIG. 13 as an example, when the mode transitions to the measurement mode M2, the mirror 7e installed inside the movable cover 7b is in a state of being disposed at a predetermined position separated in the width direction of the tire T. The arrangement of the mirror 7e is set in advance such that a desired site of the tire T is irradiated with the detection light L.

Figure 14:
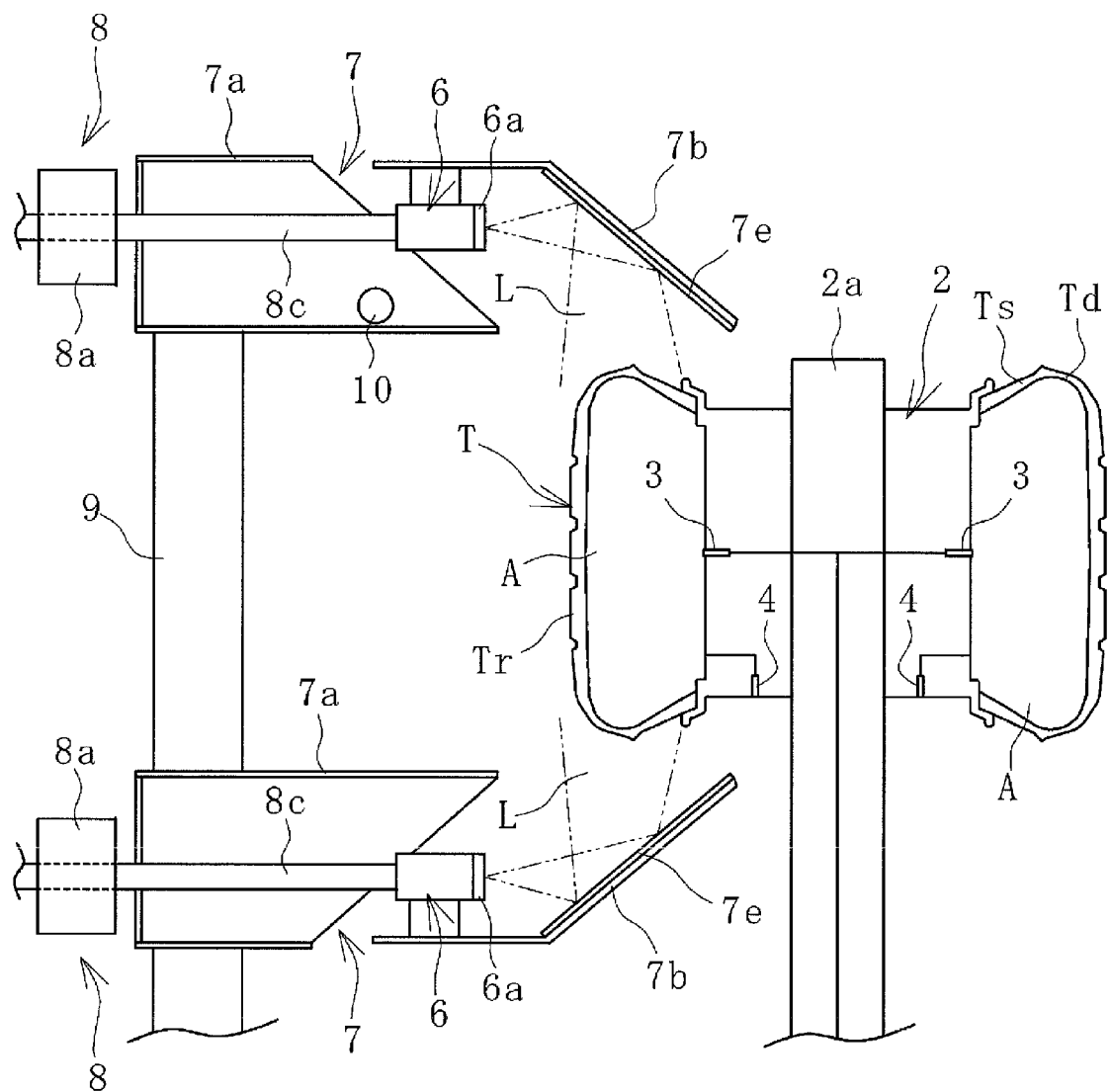
FIG. 14 is an explanatory diagram illustrating an example of a state in which shapes of a side portion and a shoulder portion of a tire of FIG. 13 are measured.

Next, in the measurement mode M2 illustrated in FIG. 14 as an example, the surface shape of the measurement site of the tire T is detected as in the above-described embodiment. The detection light L output from the detection unit 6a is reflected by the mirror 7e and the measurement site of the tire T is irradiated with the detection light L, and the detection light L reflected by the measurement site is reflected by the mirror 7e and is input to the detection unit 6a. At this time, the tire T is rotated around the rotation shaft 2a. The calculation unit 12 calculates the surface shapes of the side portion Ts and the shoulder portion Td over the entire circumference in the circumferential direction based on the detection data from the sensor 6 (detection unit 6a). In this way, the surface shapes of the entire circumference of the side portion Ts and the shoulder portion Td are detected, and data of the calculated surface shapes are stored in the calculation unit 12.

In this embodiment, the switching mechanism 8 moves the sensor 6 to switch the mode between the standby mode M1 and the measurement mode M2. The switching mechanism 8 can be configured to move the cover portion 7 in a state where the sensor 6 is fixed at a predetermined position to switch the mode between the standby mode M1 and the measurement mode M2. For example, when this embodiment is improved, the sensor 6 and the movable cover 7b are fixed via the support post 9, and the fixed cover 7a is horizontally moved by the approach/separation drive portion 8a.

Figure 15:
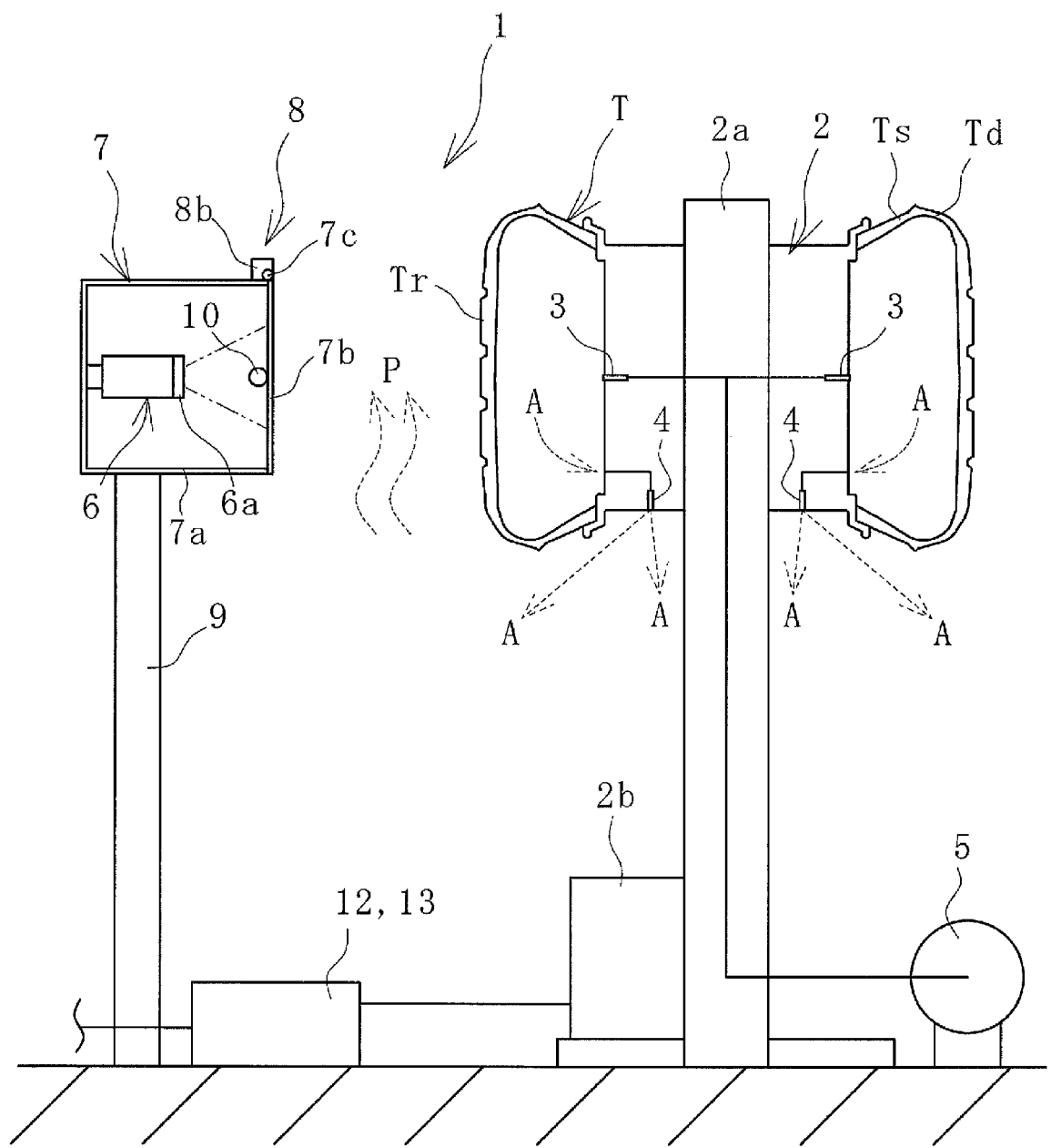
FIG. 15 is an explanatory diagram illustrating an example of a shape measurement device of another embodiment in a longitudinal cross-sectional view.
Figure 16:
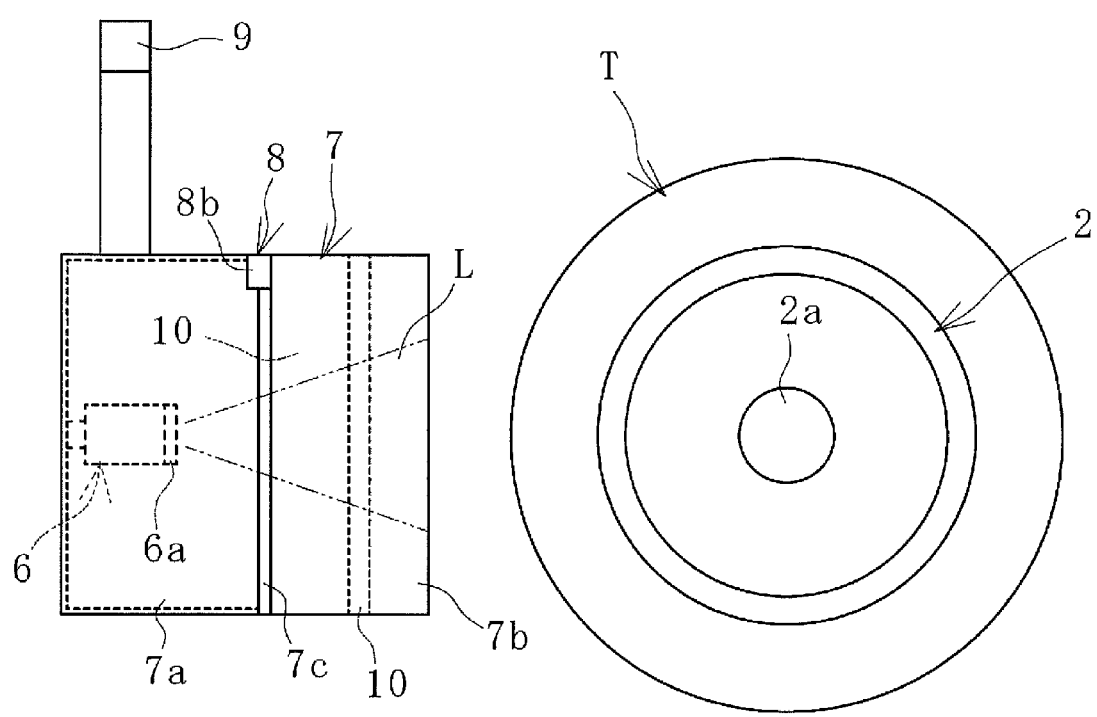
FIG. 16 is an explanatory diagram illustrating an example of the partially omitted shape measurement device of FIG. 15 in a plan view.
Figure 17:
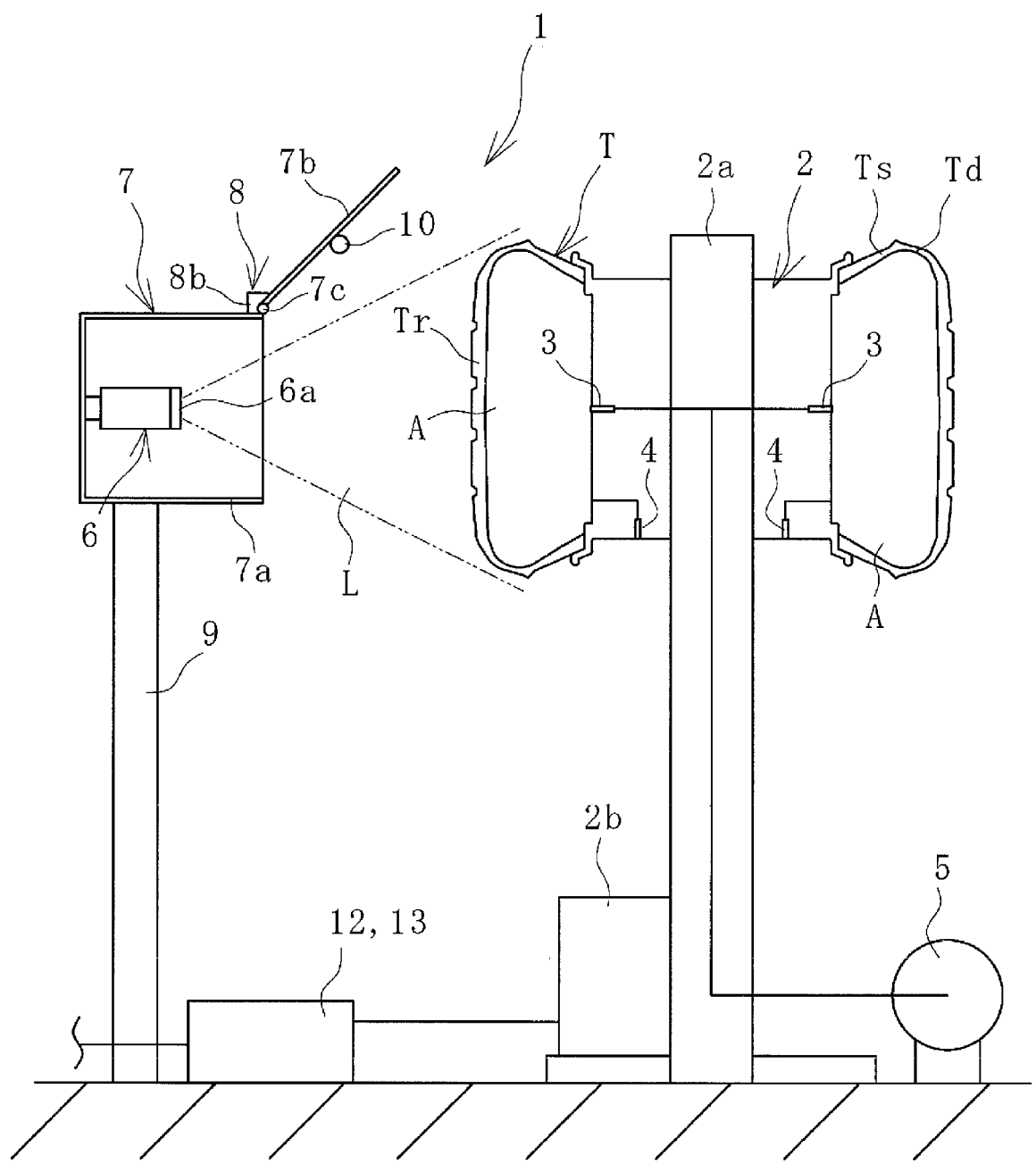
FIG. 17 is an explanatory diagram illustrating an example of a state in which a cover portion of FIG. 15 is in an open state and a shape of a tread portion of the tire is measured.

The embodiment of the shape measurement device 1 illustrated in FIGS. 15 to 17 as an example differs from the above-described respective embodiments mainly in the cover portion 7 and the switching mechanism 8. Other components (members), such as the holding portion 2, are similar to those of the respective embodiments described above. In this embodiment, the surface shape of the tread portion Tr of the tire T is detected.

The cover portion 7 includes the fixed cover 7a fixed to the support post 9 and the movable cover 7b that pivots about the support shaft 7c installed at the leading edge portion of the fixed cover 7a and approaches and separates from the fixed cover 7a. The fixed cover 7a is a box-shaped body having an open leading edge side (the right side in FIG. 15), and the movable cover 7b has a lid-shaped body that opens and closes the opening of the fixed cover 7a. The sensor 6 is fixed to the inside of the fixed cover 7a. The rod-shaped inspection member 10 is fixed to the inside of the movable cover 7b so as to cross the movable cover 7b. The movable cover 7b pivots around the support shaft 7c by the pivot drive unit 8b, and in association with this, the inspection member 10 also horizontally moves.

In the standby mode M1 illustrated in FIGS. 15 and 16 as an example, the movable cover 7b is at a position to close the opening on the leading edge side of the fixed cover 7a, and a closed space is formed by the fixed cover 7a and the movable cover 7b. The detection unit 6a (sensor 6) is disposed in the formed closed space. The inspection member 10 is also disposed in this closed space.

As illustrated in FIG. 17 as an example, in association with the movable cover 7b pivots so as to separate from the fixed cover 7a, the cover portion 7 forming the closed space is opened to form the open space, and the state in which the detection unit 6a is covered with the cover portion 7 is released to transition from the standby mode M1 to the measurement mode M2. Therefore, the pivot drive unit 8b functions as the switching mechanism 8.

In the standby mode M1 illustrated in FIGS. 15 and 16 as an example, similar to the above-described respective embodiments, since the detection unit 6a and the inspection member 10 are covered with the cover portion 7, even when the powder P or the like flies outside the cover portion 7, the cover portion 7 blocks the powder P or the like and adhesion and accumulation on the detection unit 6a are suppressed. Similarly, adhesion and accumulation of the powder P or the like on the inspection member 10 are also suppressed.

In the standby mode M1, the inspection step of the sensor 6 is performed similar to the above-described respective embodiments. The calculation unit 12 calculates the shape of the inspection member 10 based on the detection data from the sensor 6 (detection unit 6a). The calculation unit 12 compares the calculated shape of the inspection member 10 with the shape of the inspection member 10 stored in advance, thereby determining whether the sensor 6 is abnormal.

As illustrated in FIG. 17 as an example, when the mode transitions to the measurement mode M2, the desired site of the tire T is irradiated with the detection light L output from the detection unit 6a. That is, the arrangement of the sensor 6 is set in advance such that a desired site of the tire T is irradiated with the detection light L.

In the measurement mode M2 illustrated in FIG. 17 as an example, the surface shape of the measurement site of the tire T is detected similar to the above-described respective embodiments. The measurement site of the tire T is irradiated with the detection light L output from the detection unit 6a, and the detection light L reflected by the measurement site is input to the detection unit 6a. At this time, the tire T is rotated around the rotation shaft 2a. The calculation unit 12 calculates the surface shape of the tread portion Tr over the entire circumference in the circumferential direction based on the detection data from the sensor 6 (detection unit 6a). In this way, the surface shape of the entire circumference of the tread portion Tr is detected, and data of the calculated surface shapes is stored in the calculation unit 12.

Figure 18:
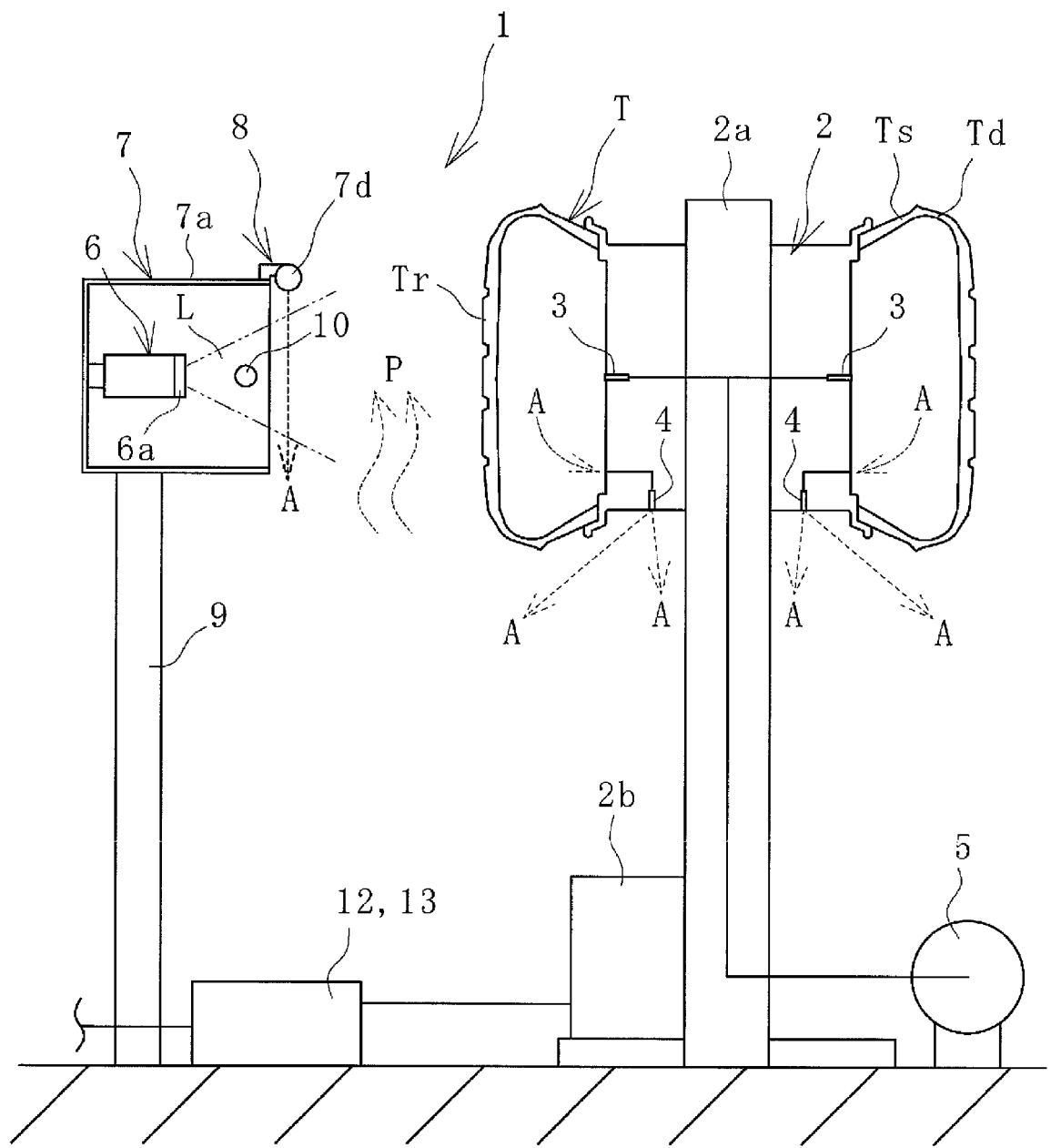
FIG. 18 is an explanatory diagram illustrating an example of a shape measurement device of another embodiment in a longitudinal cross-sectional view.
Figure 19:
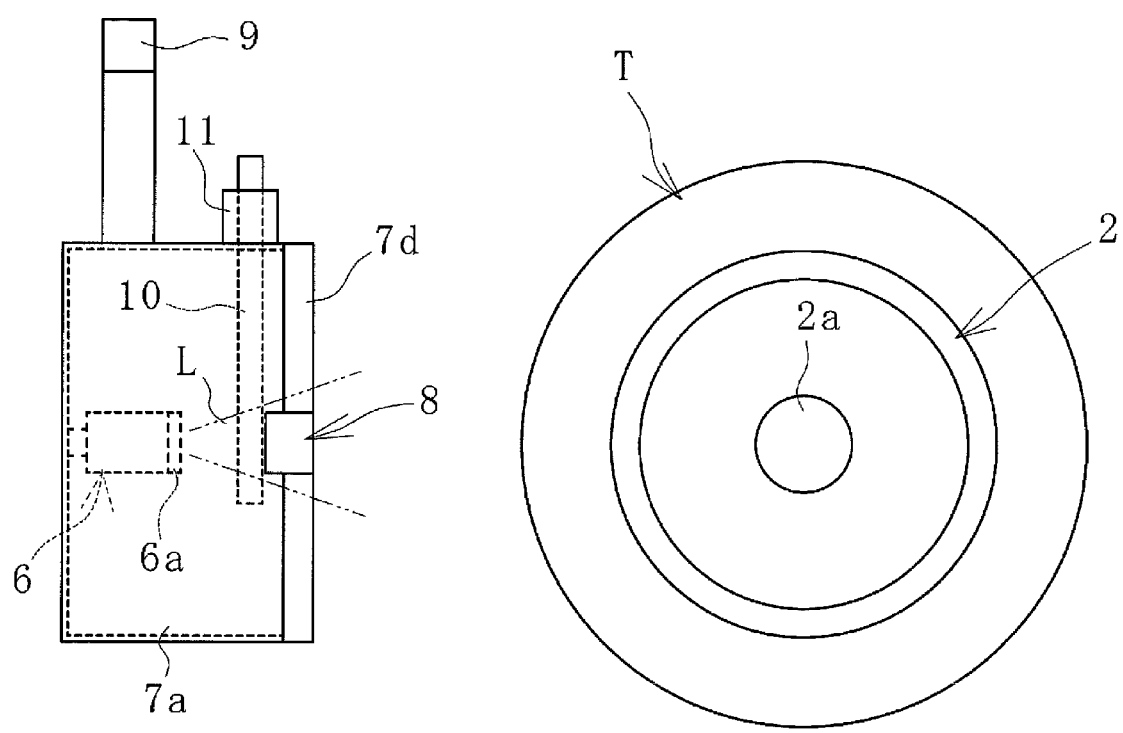
FIG. 19 is an explanatory diagram illustrating an example of the partially omitted shape measurement device of FIG. 18 in a plan view.
Figure 20:
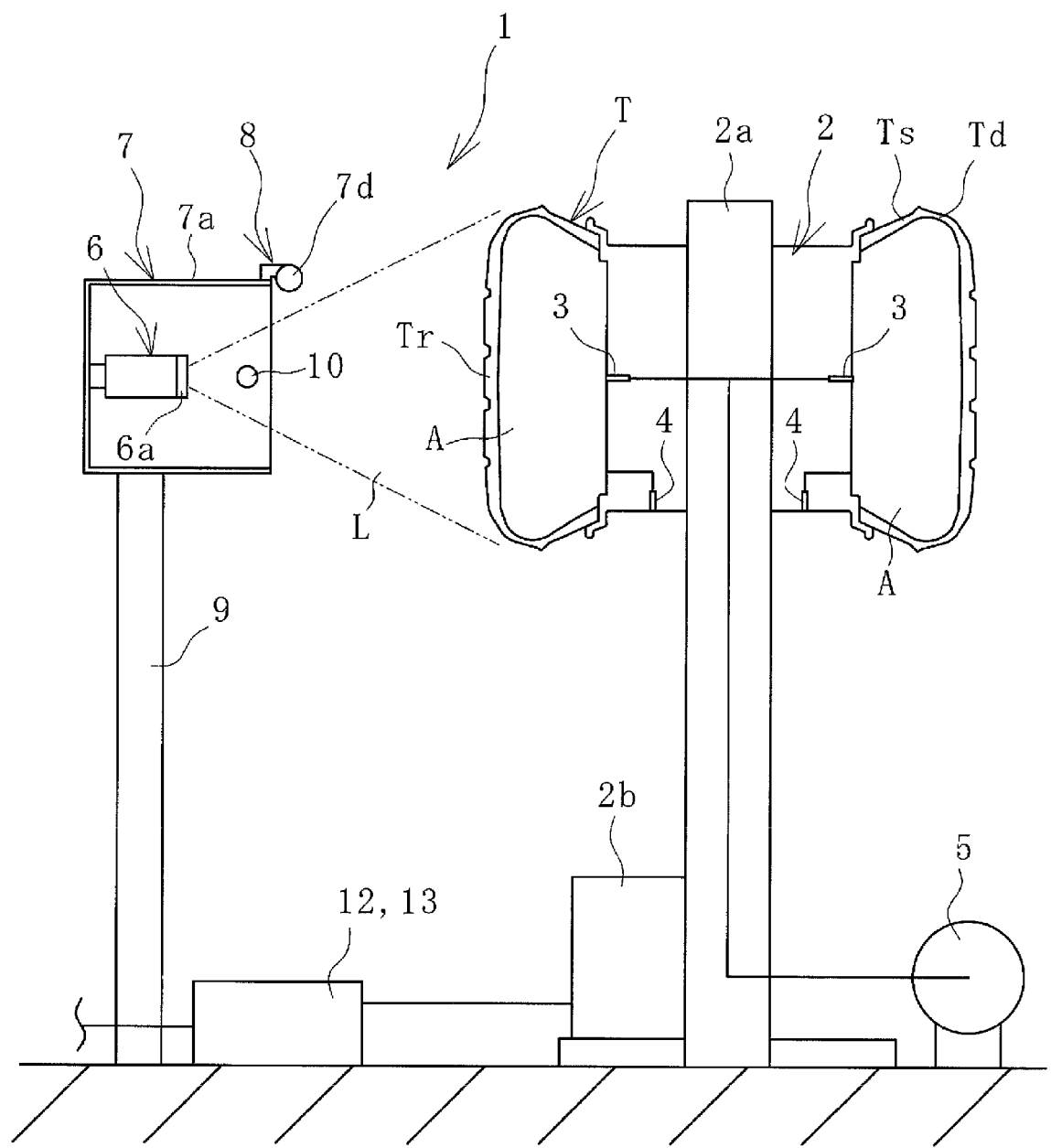
FIG. 20 is an explanatory diagram illustrating an example of a state in which a shape of a tread portion of a tire of FIG. 18 is measured.

The embodiment of the shape measurement device 1 illustrated in FIGS. 18 to 20 as an example differs from the above-described respective embodiments mainly in the cover portion 7 and the switching mechanism 8. Other components (members), such as the holding portion 2, are similar to those of the respective embodiments described above. In this embodiment, the surface shape of the tread portion Tr of the tire T is detected.

The cover portion 7 includes the fixed cover 7a fixed to the support post 9 and an air nozzle 7d installed to the leading edge portion of the fixed cover 7a. The fixed cover 7a is a box-shaped body having an open leading edge side (the right side in FIG. 18), and the air nozzle 7d injects the air A supplied from the supply source of the air A so as to cross and cover the opening of the fixed cover 7a. The air compressor 5 used for inflating the tire T can be used as the supply source of the air A. The injection of the air A by the air nozzle 7d is controlled by the control unit 13. The sensor 6 is fixed to the inside of the fixed cover 7a.

The rod-shaped inspection member 10 protrudes to the inside of the fixed cover 7a. The inspection member 10 is moved by a detection member movement mechanism 11 so as to change a protrusion length to the inside of the fixed cover 7a. As the detection member movement mechanism 11, a servo motor, a fluid cylinder, or the like can be used. The detection member movement mechanism 11 is controlled by the control unit 13.

In the standby mode M1 illustrated in FIGS. 18 and 19 as an example, the air A is injected from the air nozzle 7d, and the injected air A functions as a wall that separates the inside and the outside of the fixed cover 7a. Therefore, a closed space is formed by the fixed cover 7a and the air A injected from the air nozzle 7d. While the air A is injected from the air nozzle 7d, the injected air A and the fixed cover 7a constitute the cover portion 7. The detection unit 6a (sensor 6) is disposed in the formed closed space. The inspection member 10 is also disposed in this closed space.

As illustrated in FIG. 20 as an example, in association with stop of the injection of the air A from the air nozzle 7d, the cover portion 7 forming the closed space is opened to form the open space, and the state in which the detection unit 6a is covered with the cover portion 7 is released to transition from the standby mode M1 to the measurement mode M2. Therefore, the air nozzle 7d functions as the switching mechanism 8.

In the standby mode M1 illustrated in FIGS. 18 and 19 as an example, similar to the above-described respective embodiments, since the detection unit 6a and the inspection member 10 are covered with the cover portion 7, even when the powder P or the like flies outside the cover portion 7, the cover portion 7 blocks the powder P or the like and adhesion and accumulation on the detection unit 6a are suppressed. Similarly, adhesion and accumulation of the powder P or the like on the inspection member 10 are also suppressed.

It is only necessary to ensure suppressing adhesion and accumulation of the powder P or the like on the detection unit 6a and the inspection member 10 by the air A injected from the air nozzle 7d. Therefore, for example, a configuration in which the air A is injected from the inside of the fixed cover 7a toward the opening of the leading edge portion of the fixed cover 7a can be employed. The air nozzle 7d is provided in the cover portion 7 of each of the above-described embodiments, and the air A injected from the air nozzle 7d is caused to flow out from the inside to the outside of the cover portion 7, thereby making it possible to further suppress adhesion and accumulation of the powder P or the like on the detection unit 6a and the inspection member 10.

In the standby mode M1, the inspection step of the sensor 6 is performed similar to the above-described respective embodiments. The calculation unit 12 calculates the shape of the inspection member 10 based on the detection data from the sensor 6 (detection unit 6a). The calculation unit 12 compares the calculated shape of the inspection member 10 with the shape of the inspection member 10 stored in advance, thereby determining whether the sensor 6 is abnormal.

As illustrated in FIG. 20 as an example, when the mode transitions to the measurement mode M2, the desired site of the tire T is irradiated with the detection light L output from the detection unit 6a. That is, the arrangement of the sensor 6 is set in advance such that a desired site of the tire T is irradiated with the detection light L.

In the measurement mode M2 illustrated in FIG. 20 as an example, the surface shape of the measurement site of the tire T is detected similar to the above-described respective embodiments. The measurement site of the tire T is irradiated with the detection light L output from the detection unit 6a, and the detection light L reflected by the measurement site is input to the detection unit 6a. At this time, the tire T is rotated around the rotation shaft 2a. The calculation unit 12 calculates the surface shape of the tread portion Tr over the entire circumference in the circumferential direction based on the detection data from the sensor 6 (detection unit 6a). In this way, the surface shape of the entire circumference of the tread portion Tr is detected, and data of the calculated surface shapes is stored in the calculation unit 12.

The switching mechanism 8 can be configured to switch the mode between the standby mode M1 and measurement mode M2 by moving the cover portion 7 in a state where the sensor 6 is fixed at a predetermined position or the switching mechanism 8 can be configured to switch the mode between the standby mode M1 and measurement mode M2 by moving the sensor 6. A more appropriate configuration may be employed among any of the configurations in consideration of a constraint condition of a space in which the shape measurement device 1 is installed or the like. As in the embodiment illustrated in FIGS. 15 and 18 as an example, the configuration in which the sensor 6 is maintained in the state of being fixed at the predetermined position even when switching between the standby mode M1 and the measurement mode M2 is performed is advantageous in suppressing a variation in measurement accuracy of the sensor 6.

The configurations described in the above-described individual embodiments can be applied to the respective embodiments to the extent possible. Further, in each of the above-described embodiments, the object whose shape is measured is the vulcanized tire T. However, a green tire before vulcanization can be the object to be measured. In this case, a molding drum or the like on which the green tire is fitted serves as the holding portion 2.

The invention claimed is:

1. A tire shape measurement device, comprising:
a holder on which a tire is mounted;
an air injector configured to inject air into an inside of the tire mounted on the holder to inflate the tire;
an air exhaust configured to exhaust the air from the inside of the tire inflated to an outside to deflate the tire;
a non-contact sensor that detects a shape of the tire inflated;
a circumferential movement mechanism that relatively moves the tire held by the holder and the sensor in a tire circumferential direction;
a calculator that receives detection data from the sensor;
a cover configured to cover a detector of the sensor, a switching mechanism that switches a mode between a standby mode and a measurement mode, the detector being in a state of being covered with the cover in the standby mode, and the detector being released from the state of being covered with the cover to allow the shape of the tire to be detected by the sensor in the measurement mode, and a controller that controls the switching mechanism being provided, and
the standby mode being set when the tire is deflated, the standby mode being configured to prevent, by the cover, adhesion and accumulation on the detector of powder that flies to the peripheral region of the tire by the exhaust flow of the air exhausted from the air exhaust while the tire is deflated.

2. The tire shape measurement device according to claim 1, wherein
the switching mechanism is configured to move the sensor to switch the mode between the standby mode and the measurement mode.

3. The tire shape measurement device according to claim 1, comprising
an inspection member detected by the sensor in the standby mode, and
detection data of the inspection member collected by the sensor, wherein
the calculator is configured to determine whether the sensor is abnormal based on the detection data from the sensor that has detected the inspection member.

4. The tire shape measurement device according to claim 3, wherein
the determining is performed in each of the standby modes immediately before each of the measurement modes.

5. The tire shape measurement device according to claim 3, wherein
when the calculator has determined that the sensor is abnormal, the sensor is calibrated such that the detection data from the sensor that has detected the inspection member falls within a preset normal range.

6. The tire shape measurement device according to claim 1, wherein
the cover comprises a mirror, detection light output from the detector is caused to be reflected by the mirror to cause a measurement range of the tire to be irradiated with the detection light, and the detection light reflected by the measurement range is caused to be reflected by the mirror to be input to the detector.

7. The tire shape measurement device according to claim 1, wherein
the switching mechanism is configured to move the cover in a state where the sensor is fixed at a predetermined position to switch the mode between the standby mode and the measurement mode.

8. The tire shape measurement device according to claim 2, comprising
an inspection member detected by the sensor in the standby mode, wherein
determining whether the sensor is abnormal is performed by the calculator based on the detection data from the sensor that has detected the inspection member.

9. The tire shape measurement device according to claim 8, wherein the determining is performed in each of the standby modes immediately before each of the measurement modes.

10. The tire shape measurement device according to claim 9, wherein
when the calculator has determined that the sensor is abnormal, the sensor is calibrated such that the detection data from the sensor that has detected the inspection member falls within a preset normal range.

11. The tire shape measurement device according to claim 10, wherein
the cover comprises a mirror, detection light output from the detector is caused to be reflected by the mirror to cause a measurement range of the tire to be irradiated with the detection light, and the detection light reflected by the measurement range is caused to be reflected by the mirror to be input to the detector.

12. A tire shape measurement method, comprising:
injecting air into an inside of a tire mounted on a holder to inflate the tire;
detecting a shape of a predetermined site of the tire over an entire circumference in a tire circumferential direction by a non-contact sensor while relatively moving the tire inflated and the sensor in the tire circumferential direction; and
exhausting the air from the inside of the tire in the inflated state to an outside after the step of detecting to remove the tire deflated from the holder;
providing a cover configured to cover a detector of the sensor,
a standby mode and a measurement mode being made switchable by using a switching mechanism, the detector being in a state of being covered with the cover in the standby mode, and the detector being released from the state of being covered with the cover to allow the shape of the tire to be detected by the sensor in the measurement mode, and
the standby mode being set when the tire is deflated, the standby mode being configured to prevent, by the cover, adhesion and accumulation on the detector of powder that flies to the peripheral region of the tire by the exhaust flow of the air exhausted from the air exhaust while the tire is deflated.

13. The tire shape measurement method according to claim 12, comprising
detecting an inspection member by the sensor in the standby mode to determine whether the sensor is abnormal is performed by a calculator based on detection data from the sensor that has detected the inspection member.

* * * * *